US012592042B2

(12) United States Patent
Najumudeen et al.

(10) Patent No.: US 12,592,042 B2
(45) Date of Patent: Mar. 31, 2026

(54) SYSTEMS AND METHODS FOR MAINTAINING SECURITY OF VIRTUAL OBJECTS IN A DISTRIBUTED NETWORK

(71) Applicant: BANK OF AMERICA CORPORATION, Charlotte, NC (US)

(72) Inventors: Syed Najumudeen, Telengana (IN); Dalydas Karanath, Kerala (IN); Aravinth Selvamani, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 59 days.

(21) Appl. No.: 18/378,049

(22) Filed: Oct. 9, 2023

(65) Prior Publication Data

US 2025/0118029 A1     Apr. 10, 2025

(51) Int. Cl.
| | |
|---|---|
| *G06T 19/00* | (2011.01) |
| *G06T 13/40* | (2011.01) |
| *H04L 9/40* | (2022.01) |

(52) U.S. Cl.
CPC ............ *G06T 19/003* (2013.01); *G06T 13/40* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,684,265 | B2 | 1/2004 | Graf |
| 7,386,799 | B1 | 6/2008 | Clanton et al. |

| | | | | |
|---|---|---|---|---|
| 7,467,356 | B2 | 12/2008 | Gettman et al. | |
| 7,509,369 | B1 | 3/2009 | Tormasov | |
| 7,587,492 | B2 | 9/2009 | Dyck et al. | |
| 7,653,877 | B2 | 1/2010 | Matsuda | |
| 7,746,343 | B1 | 6/2010 | Charaniya et al. | |
| 7,814,154 | B1 | 10/2010 | Kandekar et al. | |
| 7,822,687 | B2 | 10/2010 | Brillon et al. | |
| 7,908,554 | B1 | 3/2011 | Blattner | |
| 8,014,567 | B2 | 9/2011 | Yoon et al. | |
| 8,055,656 | B2 * | 11/2011 | Cradick ................. | G06F 3/012 |
| | | | | 707/739 |
| 8,127,235 | B2 | 2/2012 | Haggar et al. | |
| 8,224,652 | B2 | 7/2012 | Wang et al. | |

(Continued)

OTHER PUBLICATIONS

Kumar et al., "Explainable AI and Blockchain for Metaverse: A Security and Privacy Perspective" (Year 2023).

*Primary Examiner* — Hilina K Demeter
(74) *Attorney, Agent, or Firm* — Moore & Van Allen PLLC; R.W. McCord Rayburn

(57) ABSTRACT

Systems, computer program products, and methods are described herein for maintaining security of virtual objects in a distributed network. Some embodiments are directed to a system including a first artificial intelligence engine configured to determine viewing angles of avatars moving along access paths in a virtual world and a second artificial intelligence engine configured to determine movements of the avatars moving along the access paths in the virtual world. The system may include a third artificial intelligence engine configured to generate visual content based on attributes of users associated with the avatars, the access paths, the viewing angles of the avatars moving along the access paths in the virtual world, and the movements of the avatars moving along the access paths in the virtual world.

20 Claims, 15 Drawing Sheets

(56)                References Cited

U.S. PATENT DOCUMENTS

| | | | |
|---|---|---|---|
| 8,234,579 B2 | 7/2012 | Do et al. | |
| 8,396,004 B2 | 3/2013 | Pratt et al. | |
| 8,516,396 B2 * | 8/2013 | Bromenshenkel | G06Q 30/06 |
| | | | 715/848 |
| 9,245,177 B2 | 1/2016 | Perez | |
| 10,086,285 B2 * | 10/2018 | Rosedale | A63F 13/52 |
| 10,702,773 B2 | 7/2020 | Davis | |
| 11,409,405 B1 * | 8/2022 | Hlavac | G06F 3/0346 |
| 11,522,781 B1 | 12/2022 | Nelluri | |
| 11,606,426 B1 | 3/2023 | Cascioli | |
| 11,630,916 B1 | 4/2023 | Hwang | |
| 11,868,672 B1 | 1/2024 | Dehkordi | |
| 12,034,785 B2 | 7/2024 | Yerli | |
| 12,086,915 B2 | 9/2024 | Saito | |
| 12,107,967 B2 | 10/2024 | Kurian | |
| 12,159,352 B2 | 12/2024 | Choi | |
| 12,517,623 B2 | 1/2026 | Najumudeen | |
| 2013/0005458 A1 | 1/2013 | Kosta | |
| 2017/0148267 A1 * | 5/2017 | Parker | G07F 17/323 |
| 2019/0065970 A1 | 2/2019 | Bonutti | |
| 2020/0410111 A1 | 12/2020 | Breindel | |
| 2021/0011607 A1 * | 1/2021 | Ziman | G06T 19/003 |
| 2021/0124465 A1 | 4/2021 | Sahu | |
| 2022/0222284 A1 | 7/2022 | Sahoo | |
| 2023/0368887 A1 | 11/2023 | Roh | |
| 2023/0392935 A1 | 12/2023 | Maggiore | |
| 2023/0397578 A1 | 12/2023 | Khare | |
| 2024/0004456 A1 * | 1/2024 | Todasco | G06F 3/011 |
| 2024/0045942 A1 * | 2/2024 | Lal | G06F 21/36 |
| 2024/0061545 A1 * | 2/2024 | Gu | G06F 3/016 |
| 2024/0073219 A1 | 2/2024 | Maizels | |
| 2024/0078297 A1 * | 3/2024 | Bhatia | G06F 3/011 |
| 2024/0221776 A1 | 7/2024 | Kim | |
| 2025/0118029 A1 | 4/2025 | Najumudeen | |
| 2025/0119429 A1 | 4/2025 | Najumudeen | |

* cited by examiner

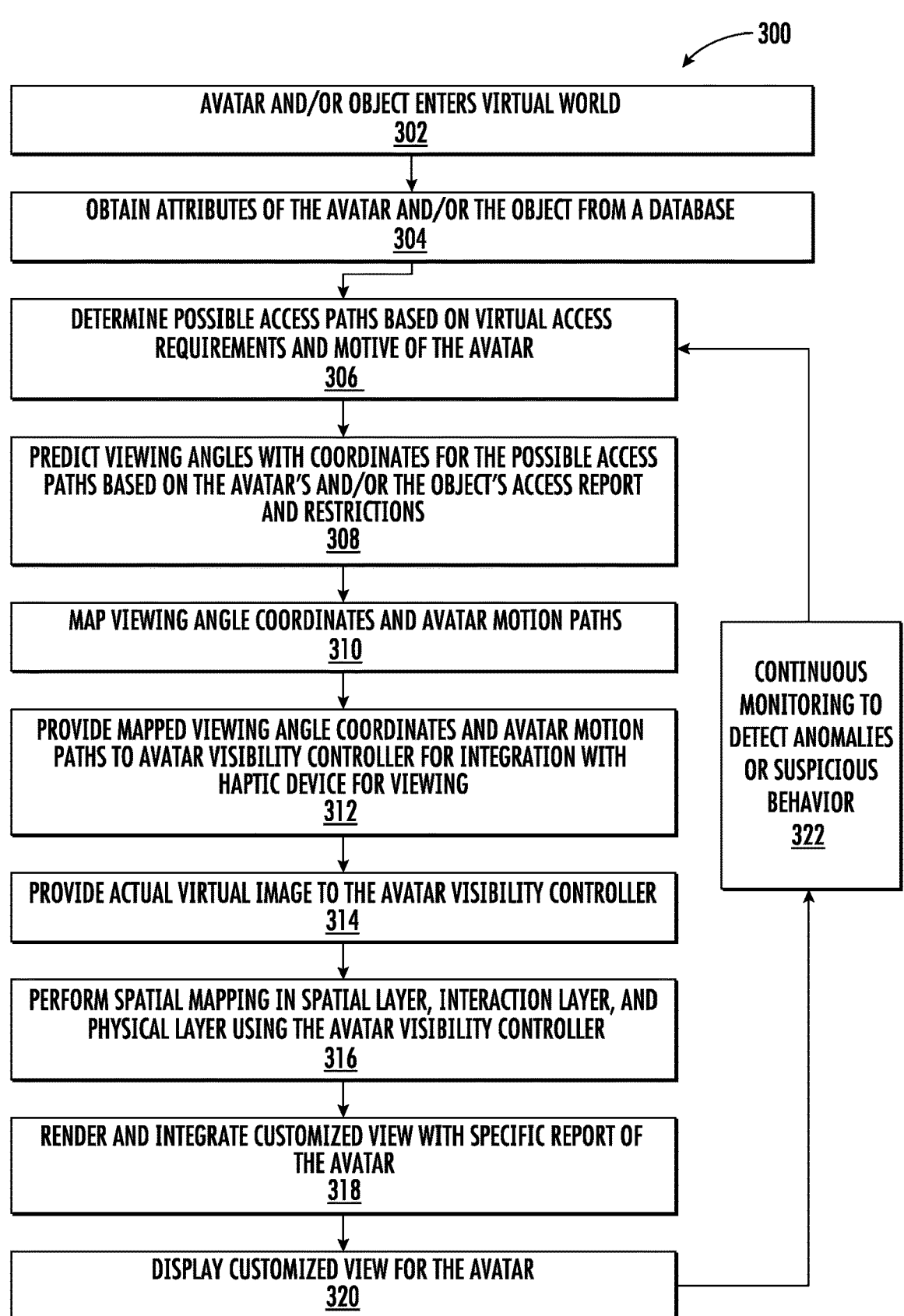

300

AVATAR AND/OR OBJECT ENTERS VIRTUAL WORLD
302

OBTAIN ATTRIBUTES OF THE AVATAR AND/OR THE OBJECT FROM A DATABASE
304

DETERMINE POSSIBLE ACCESS PATHS BASED ON VIRTUAL ACCESS
REQUIREMENTS AND MOTIVE OF THE AVATAR
306

PREDICT VIEWING ANGLES WITH COORDINATES FOR THE POSSIBLE ACCESS
PATHS BASED ON THE AVATAR'S AND/OR THE OBJECT'S ACCESS REPORT
AND RESTRICTIONS
308

MAP VIEWING ANGLE COORDINATES AND AVATAR MOTION PATHS
310

PROVIDE MAPPED VIEWING ANGLE COORDINATES AND AVATAR MOTION
PATHS TO AVATAR VISIBILITY CONTROLLER FOR INTEGRATION WITH
HAPTIC DEVICE FOR VIEWING
312

PROVIDE ACTUAL VIRTUAL IMAGE TO THE AVATAR VISIBILITY CONTROLLER
314

PERFORM SPATIAL MAPPING IN SPATIAL LAYER, INTERACTION LAYER, AND
PHYSICAL LAYER USING THE AVATAR VISIBILITY CONTROLLER
316

RENDER AND INTEGRATE CUSTOMIZED VIEW WITH SPECIFIC REPORT OF
THE AVATAR
318

DISPLAY CUSTOMIZED VIEW FOR THE AVATAR
320

CONTINUOUS
MONITORING TO
DETECT ANOMALIES
OR SUSPICIOUS
BEHAVIOR
322

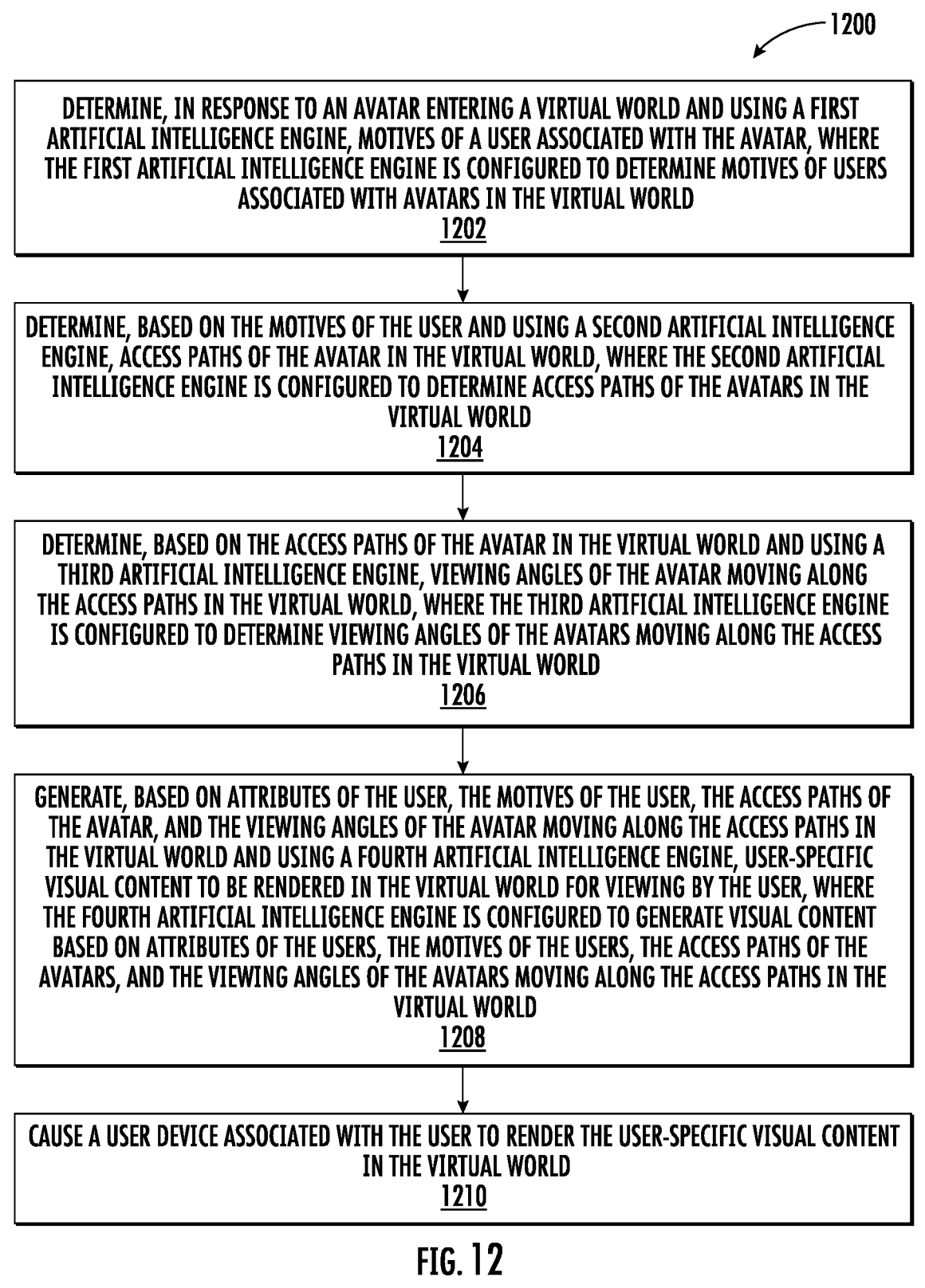

DETERMINE, IN RESPONSE TO AN AVATAR ENTERING A VIRTUAL WORLD AND USING A FIRST ARTIFICIAL INTELLIGENCE ENGINE, MOTIVES OF A USER ASSOCIATED WITH THE AVATAR, WHERE THE FIRST ARTIFICIAL INTELLIGENCE ENGINE IS CONFIGURED TO DETERMINE MOTIVES OF USERS ASSOCIATED WITH AVATARS IN THE VIRTUAL WORLD
1202

DETERMINE, BASED ON THE MOTIVES OF THE USER AND USING A SECOND ARTIFICIAL INTELLIGENCE ENGINE, ACCESS PATHS OF THE AVATAR IN THE VIRTUAL WORLD, WHERE THE SECOND ARTIFICIAL INTELLIGENCE ENGINE IS CONFIGURED TO DETERMINE ACCESS PATHS OF THE AVATARS IN THE VIRTUAL WORLD
1204

DETERMINE, BASED ON THE ACCESS PATHS OF THE AVATAR IN THE VIRTUAL WORLD AND USING A THIRD ARTIFICIAL INTELLIGENCE ENGINE, VIEWING ANGLES OF THE AVATAR MOVING ALONG THE ACCESS PATHS IN THE VIRTUAL WORLD, WHERE THE THIRD ARTIFICIAL INTELLIGENCE ENGINE IS CONFIGURED TO DETERMINE VIEWING ANGLES OF THE AVATARS MOVING ALONG THE ACCESS PATHS IN THE VIRTUAL WORLD
1206

GENERATE, BASED ON ATTRIBUTES OF THE USER, THE MOTIVES OF THE USER, THE ACCESS PATHS OF THE AVATAR, AND THE VIEWING ANGLES OF THE AVATAR MOVING ALONG THE ACCESS PATHS IN THE VIRTUAL WORLD AND USING A FOURTH ARTIFICIAL INTELLIGENCE ENGINE, USER-SPECIFIC VISUAL CONTENT TO BE RENDERED IN THE VIRTUAL WORLD FOR VIEWING BY THE USER, WHERE THE FOURTH ARTIFICIAL INTELLIGENCE ENGINE IS CONFIGURED TO GENERATE VISUAL CONTENT BASED ON ATTRIBUTES OF THE USERS, THE MOTIVES OF THE USERS, THE ACCESS PATHS OF THE AVATARS, AND THE VIEWING ANGLES OF THE AVATARS MOVING ALONG THE ACCESS PATHS IN THE VIRTUAL WORLD
1208

CAUSE A USER DEVICE ASSOCIATED WITH THE USER TO RENDER THE USER-SPECIFIC VISUAL CONTENT IN THE VIRTUAL WORLD
1210

FIG. 12

SYSTEMS AND METHODS FOR MAINTAINING SECURITY OF VIRTUAL OBJECTS IN A DISTRIBUTED NETWORK

TECHNOLOGICAL FIELD

Example embodiments of the present disclosure relate to systems and methods for maintaining security of virtual objects in a distributed network.

BACKGROUND

A virtual world or virtual space is a computer-simulated environment which may be populated by many users represented by personal avatars. The users may use the avatars to explore the virtual world simultaneously and independently, participate in its activities, communicate with others, interact with objects, and/or the like. Avatars may be textual, graphical representations, and/or live video avatars with auditory and touch sensations.

BRIEF SUMMARY

Systems, methods, and computer program products are provided for maintaining security of virtual objects in a distributed network.

In one aspect, the present invention is directed to a system for maintaining security of virtual objects in a distributed network. The system may include a first artificial intelligence engine configured to determine viewing angles of avatars moving along access paths in a virtual world and a second artificial intelligence engine configured to determine movements of the avatars moving along the access paths in the virtual world. The system may include a third artificial intelligence engine configured to generate visual content based on attributes of users associated with the avatars, the access paths, the viewing angles of the avatars moving along the access paths in the virtual world, and the movements of the avatars moving along the access paths in the virtual world. The system may include a processing device and a non-transitory storage device including computer program code stored thereon. The computer program code may include computer instructions configured to cause the processing device to determine access paths of an avatar in the virtual world, where the avatar is associated with a user, and determine, based on the access paths of the avatar in the virtual world and using the first artificial intelligence engine, viewing angles of the avatar moving along the access paths in the virtual world. The computer program code may include computer instructions configured to cause the processing device to determine, based on the access paths of the avatar in the virtual world and using the second artificial intelligence engine, movements of the avatar moving along the access paths in the virtual world. The computer program code may include computer instructions configured to cause the processing device to generate, based on attributes of the user, the access paths of the avatar, the viewing angles of the avatar moving along the access paths in the virtual world, the movements of the avatar moving along the access paths, and using the third artificial intelligence engine, user-specific visual content to be rendered in the virtual world for viewing by the user. The computer program code may include computer instructions configured to cause the processing device to cause a user device associated with the user to render the user-specific visual content in the virtual world.

In some embodiments, the attributes of the user may include privileges of the user. Additionally, or alternatively, the computer program code may include computer instructions configured to cause the processing device to, when generating the user-specific visual content, generate, using the third artificial intelligence engine, the user-specific visual content to (i) omit information that the user is not privileged to view and (ii) include normalizing visual content that, when rendered by the user device, makes the virtual world appear normal to the user despite the omitted information. In some embodiments, the omitted information may include an object in the virtual world, confidential information, another avatar in the virtual world, another access path, and/or the like. Additionally, or alternatively, the omitted information may be viewable by other users associated with other avatars in the virtual world.

In some embodiments, the computer program code may include computer instructions configured to cause the processing device to monitor actions of the avatar within the virtual world and/or update, based on the actions of the avatar and using the first artificial intelligence engine, the viewing angles of the avatar. Additionally, or alternatively, the computer program code may include computer instructions configured to cause the processing device to update, based on the actions of the avatar and using the second artificial intelligence engine, the movements of the avatar. In some embodiments, the computer program code may include computer instructions configured to cause the processing device to update, based on the updated viewing angles and using the third artificial intelligence engine, the visual content to be rendered in the virtual world for viewing by the user. Additionally, or alternatively, the computer program code may include computer instructions configured to cause the processing device to cause the user device associated with the user to render the updated visual content in the virtual world.

In some embodiments, the system may include the user device, the user device may include a display, and the computer program code may include computer instructions configured to cause the processing device to, when causing the user device associated with the user to render the user-specific visual content in the virtual world, render the user-specific visual content in the virtual world on the display. Additionally, or alternatively, the user device may include a control interface, and the computer program code may include computer instructions configured to cause the processing device to, when causing the user device associated with the user to render the user-specific visual content in the virtual world, provide haptic feedback to the user via the control interface as the user interacts with the virtual world.

In another aspect, the present invention is directed to a computer program product for maintaining security of virtual objects in a distributed network. The computer program product may include a non-transitory computer-readable medium including code causing an apparatus to determine access paths of an avatar in the virtual world, wherein the avatar is associated with a user, and determine, based on the access paths of the avatar in the virtual world and using a first artificial intelligence engine, viewing angles of the avatar moving along the access paths in the virtual world, where the first artificial intelligence engine is configured to determine viewing angles of avatars moving along access paths in a virtual world. The computer program product may include a non-transitory computer-readable medium including code causing an apparatus to determine, based on the access paths of the avatar in the virtual world and using a second artificial intelligence engine, movements of the avatar moving along the access paths in the virtual world, where the second artificial intelligence engine is configured to determine movements of the avatars moving along the access paths in the virtual world. The computer program product may include a non-transitory computer-readable medium including code causing an apparatus to generate, based on attributes of the user, the access paths of the avatar, the viewing angles of the avatar moving along the access paths in the virtual world, the movements of the avatar moving along the access paths, and using a third artificial intelligence engine, user-specific visual content to be rendered in the virtual world for viewing by the user, where the third artificial intelligence engine is configured to generate visual content based on attributes of users associated with the avatars, the access paths, the viewing angles of the avatars moving along the access paths in the virtual world, and the movements of the avatars moving along the access paths in the virtual world. The computer program product may include a non-transitory computer-readable medium including code causing an apparatus to cause a user device associated with the user to render the user-specific visual content in the virtual world.

In some embodiments, the attributes of the user may include privileges of the user. Additionally, or alternatively, the non-transitory computer-readable medium may include code causing the apparatus to, when generating the user-specific visual content, generate, using the third artificial intelligence engine, the user-specific visual content to (i) omit information that the user is not privileged to view and (ii) include normalizing visual content that, when rendered by the user device, makes the virtual world appear normal to the user despite the omitted information. In some embodiments, the omitted information may include an object in the virtual world, confidential information, another avatar in the virtual world, another access path, and/or the like. Additionally, or alternatively, the omitted information may be viewable by other users associated with other avatars in the virtual world.

In some embodiments, the non-transitory computer-readable medium may include code causing the apparatus to monitor actions of the avatar within the virtual world and update, based on the actions of the avatar and using the first artificial intelligence engine, the viewing angles of the avatar. Additionally, or alternatively, the non-transitory computer-readable medium may include code causing the apparatus to update, based on the updated viewing angles and using the third artificial intelligence engine, the visual content to be rendered in the virtual world for viewing by the user.

In another aspect, the present invention is directed to a method for maintaining security of virtual objects in a distributed network. The method may include determining access paths of an avatar in a virtual world, where the avatar is associated with a user, and determining, based on the access paths of the avatar in the virtual world and using a first artificial intelligence engine, viewing angles of the avatar moving along the access paths in the virtual world, where the first artificial intelligence engine is configured to determine viewing angles of avatars moving along access paths in a virtual world. The method may include determining, based on the access paths of the avatar in the virtual world and using a second artificial intelligence engine, movements of the avatar moving along the access paths in the virtual world, where the second artificial intelligence engine is configured to determine movements of the avatars moving along the access paths in the virtual world. The method may include generating, based on attributes of the user, the access paths of the avatar, the viewing angles of the avatar moving along the access paths in the virtual world, the movements of the avatar moving along the access paths, and using a third artificial intelligence engine, user-specific visual content to be rendered in the virtual world for viewing by the user, where the third artificial intelligence engine is configured to generate visual content based on attributes of users associated with the avatars, the access paths, the viewing angles of the avatars moving along the access paths in the virtual world, and the movements of the avatars moving along the access paths in the virtual world. The method may include causing a user device associated with the user to render the user-specific visual content in the virtual world.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components or blocks than those shown in the figures.

Figure 1A:
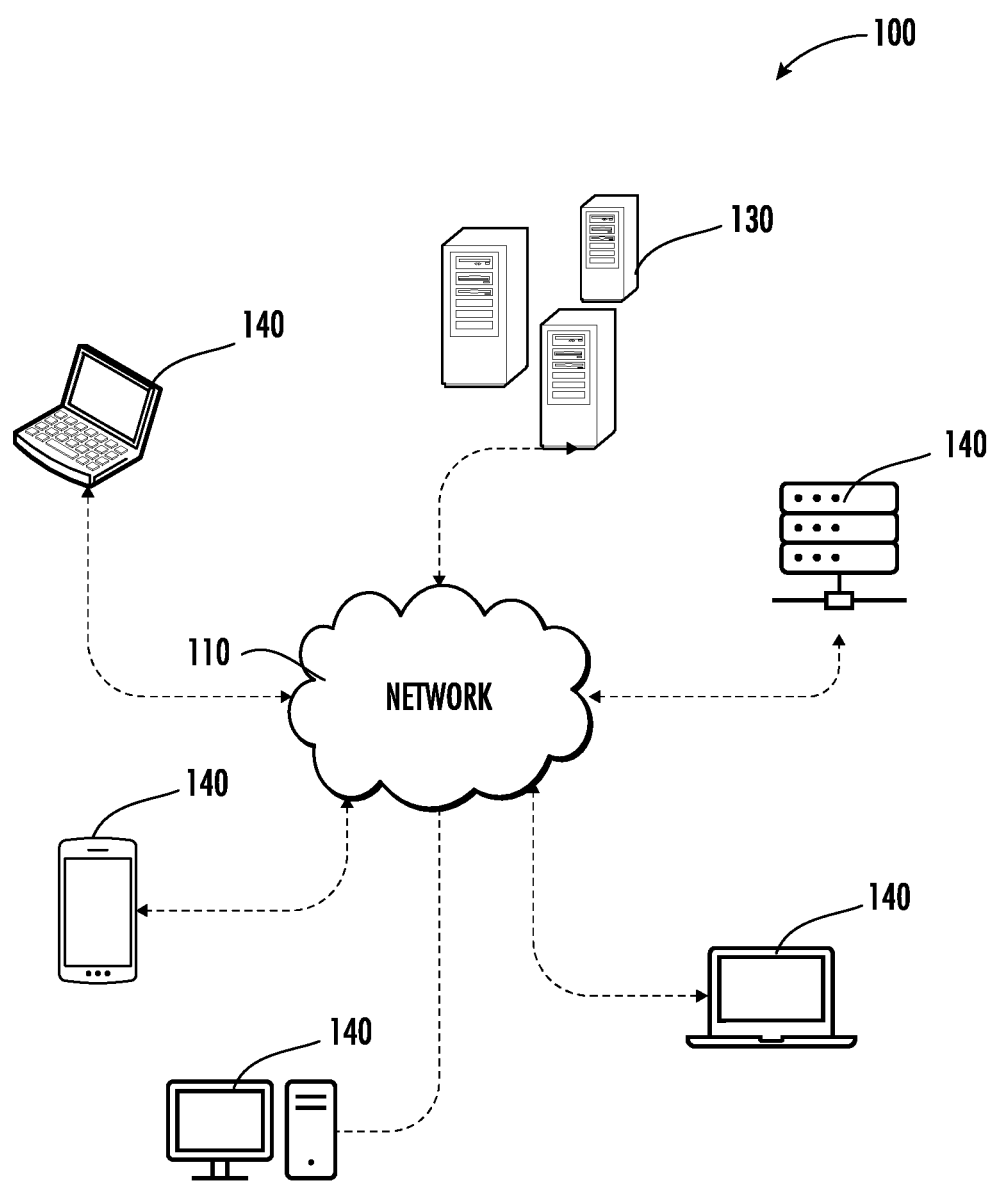
Figure 1B:
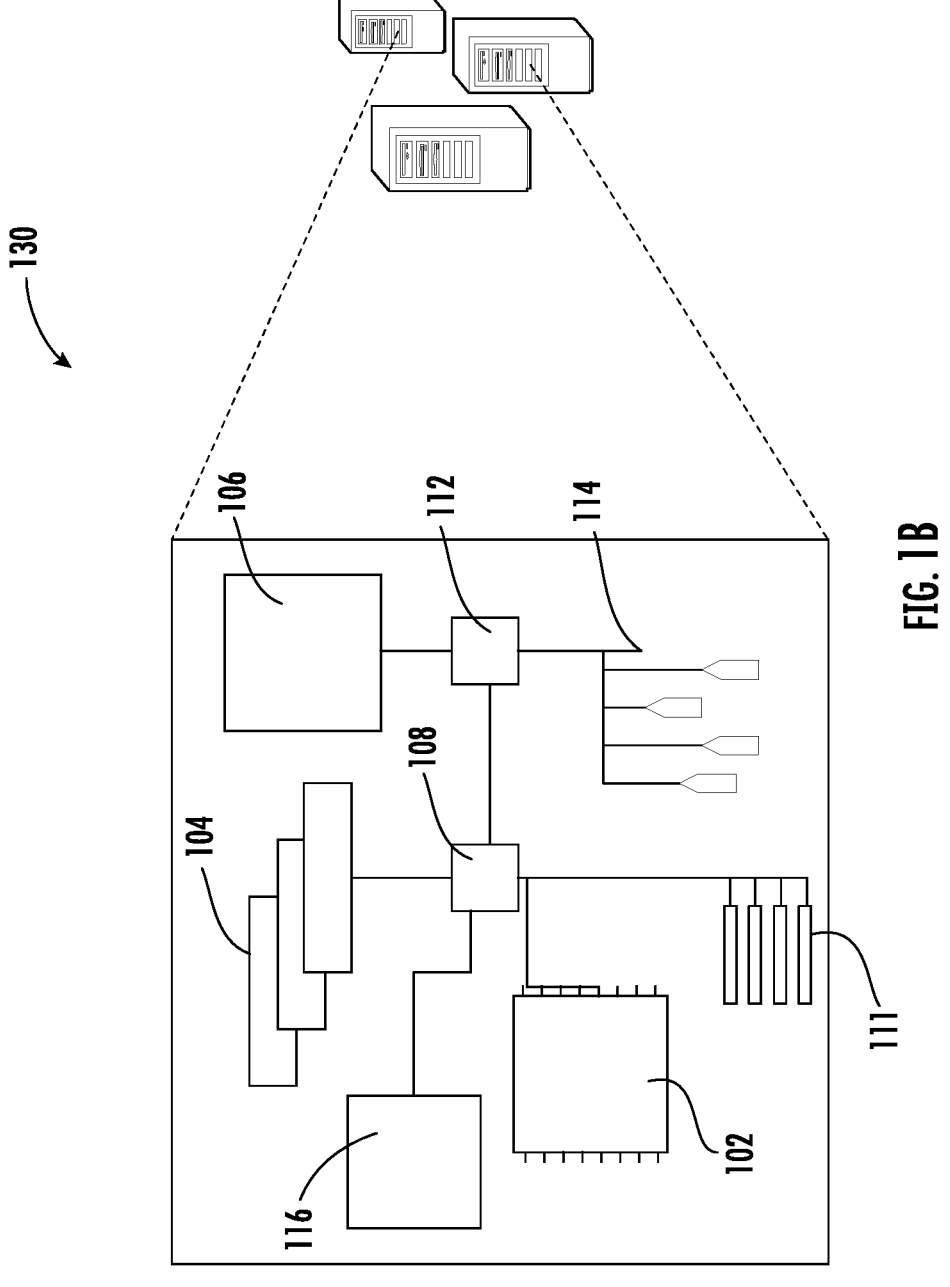
Figure 1C:
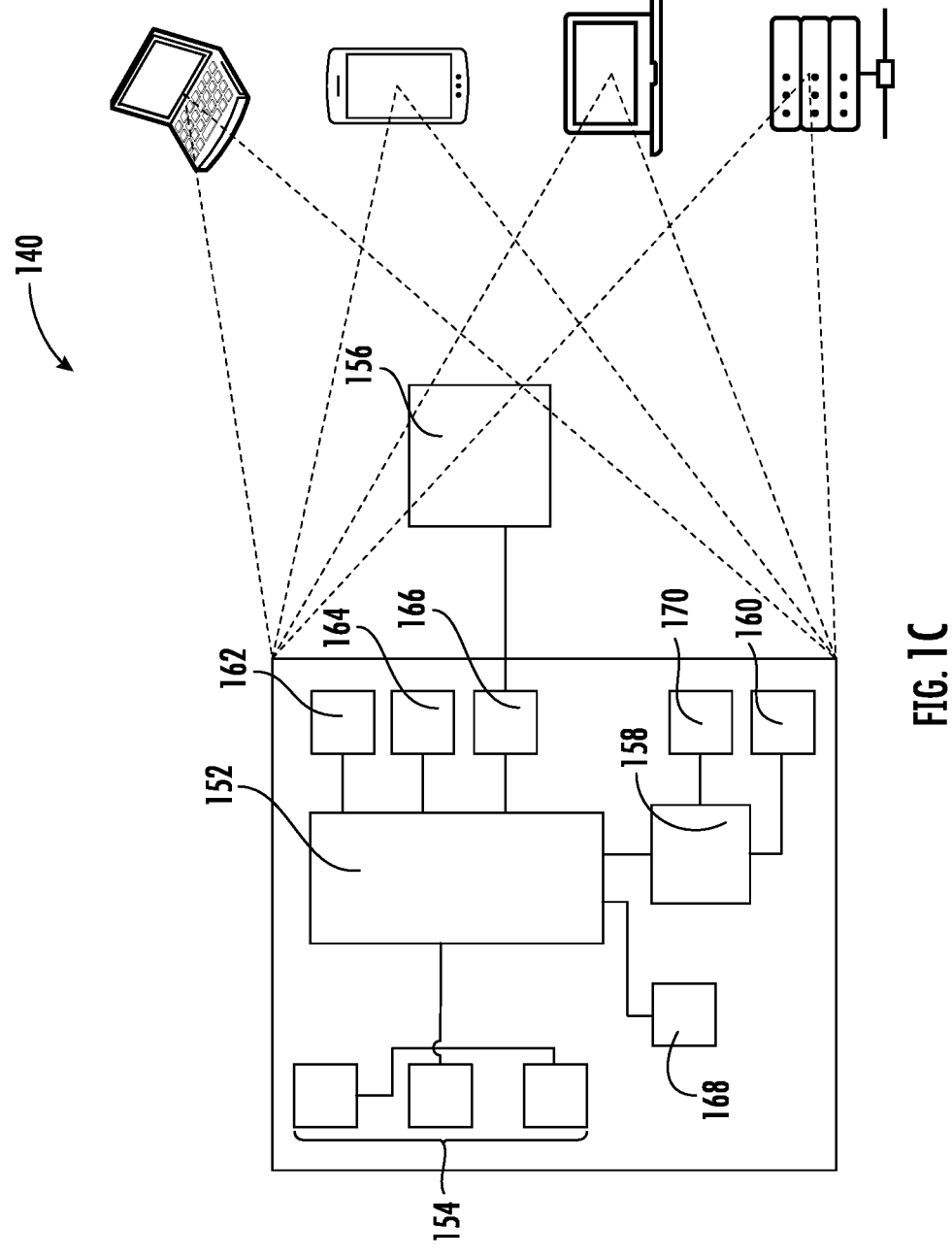
Figure 2:
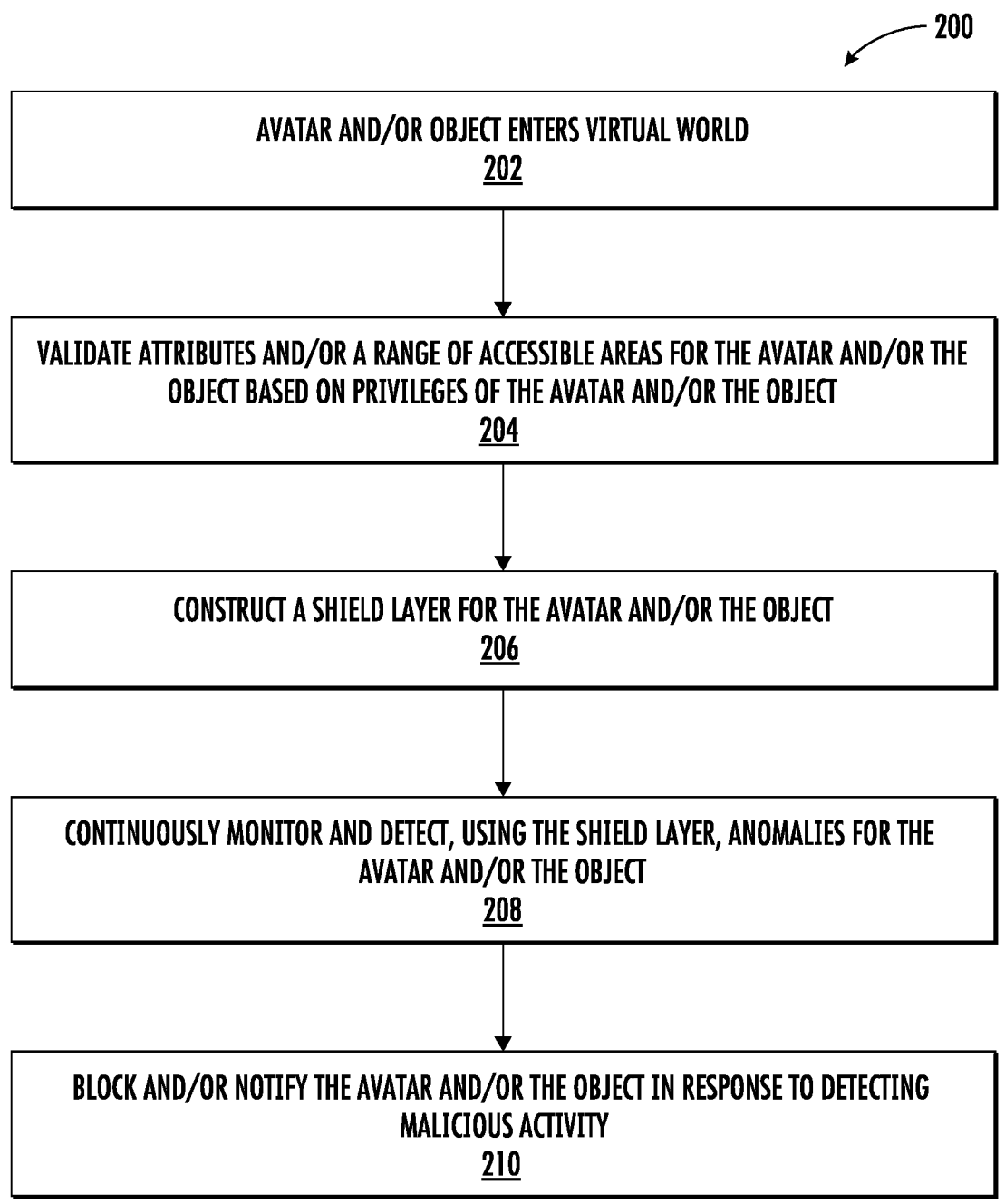

FIGS. 1A-1C illustrates technical components of an exemplary distributed computing environment for maintaining security of virtual objects in a distributed network, in accordance with an embodiment of the disclosure;

FIG. 2 illustrates a process flow for maintaining security of virtual objects in a distributed network, in accordance with an embodiment of the disclosure.

FIG. 3 illustrates another process flow for maintaining security of virtual objects in a distributed network, in accordance with an embodiment of the disclosure.

Figure 4:
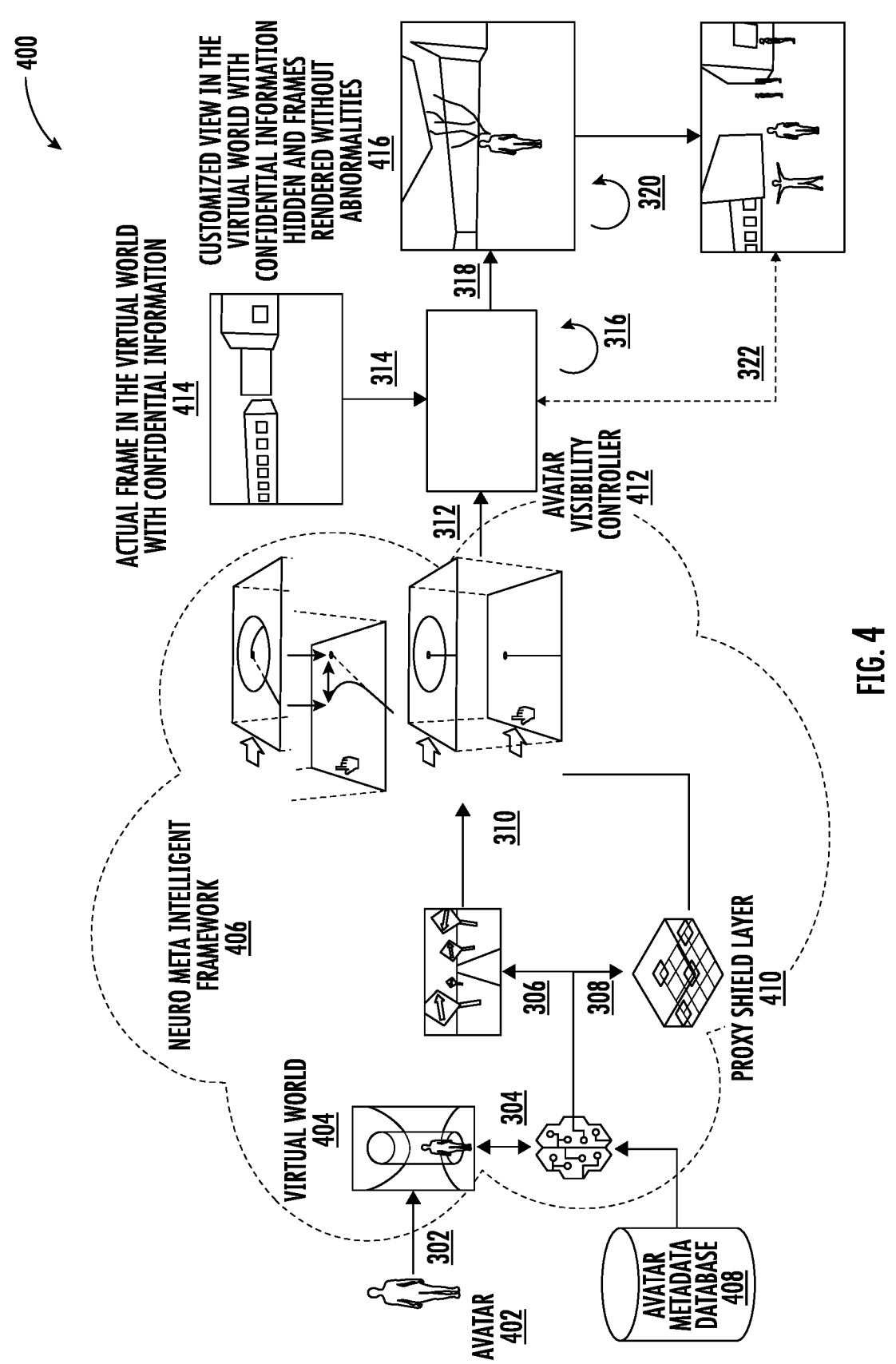

FIG. 4 illustrates another process flow for maintaining security of virtual objects in a distributed network, in accordance with an embodiment of the disclosure.

Figure 5:
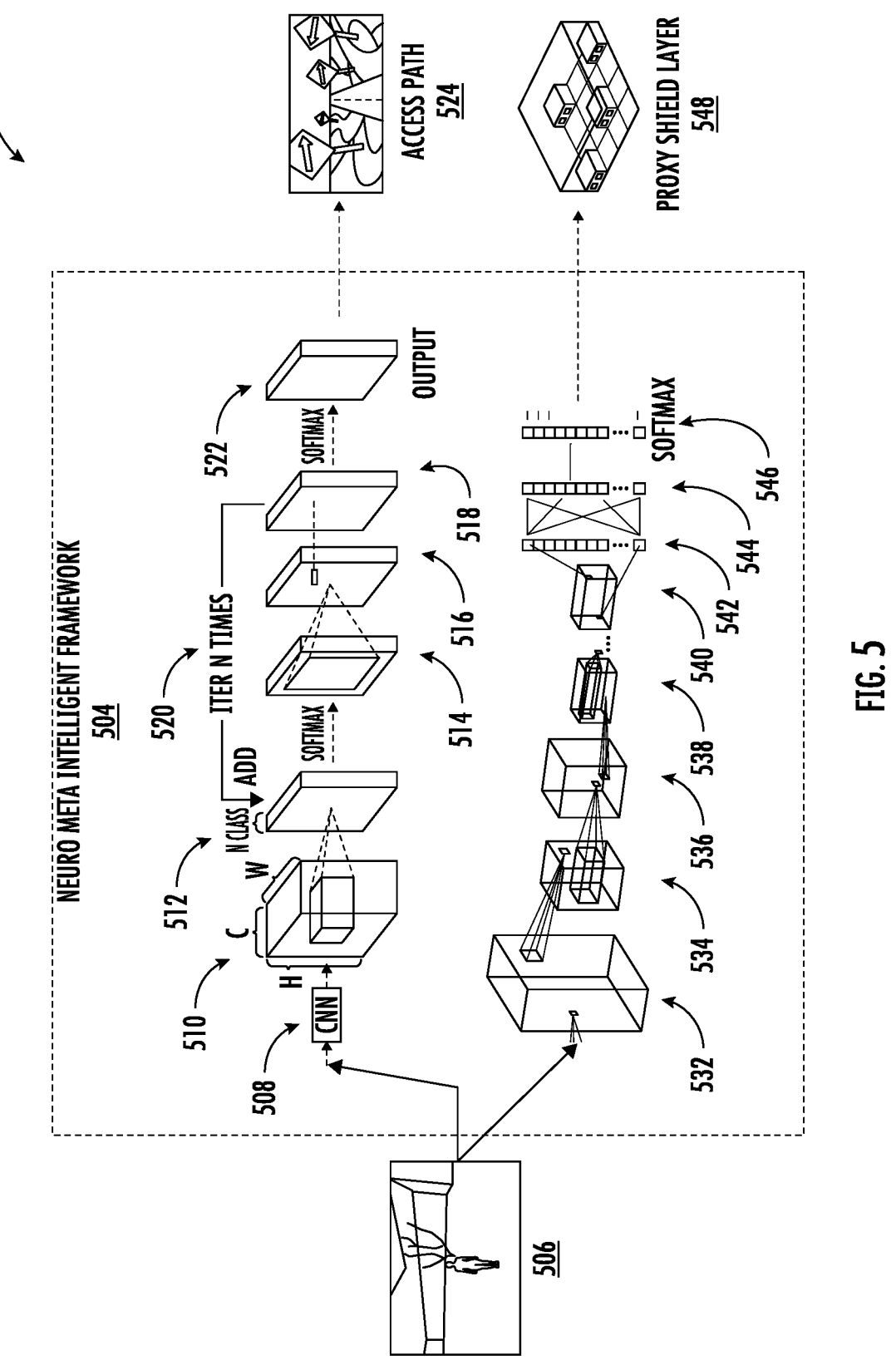

FIG. 5 illustrates another process flow for maintaining security of virtual objects in a distributed network, in accordance with an embodiment of the disclosure.

Figure 6:
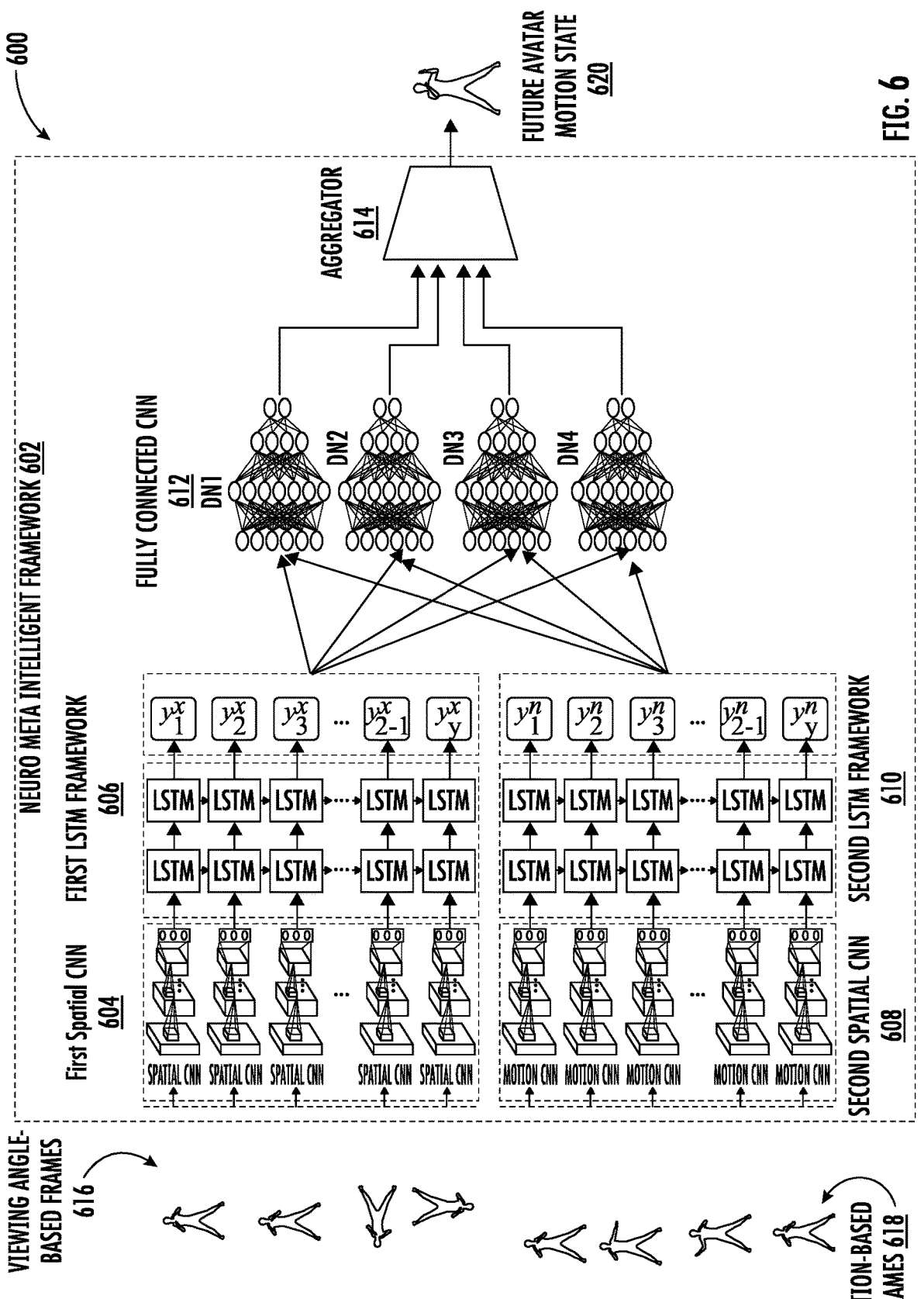

FIG. 6 illustrates another process flow for maintaining security of virtual objects in a distributed network, in accordance with an embodiment of the disclosure.

Figure 7:
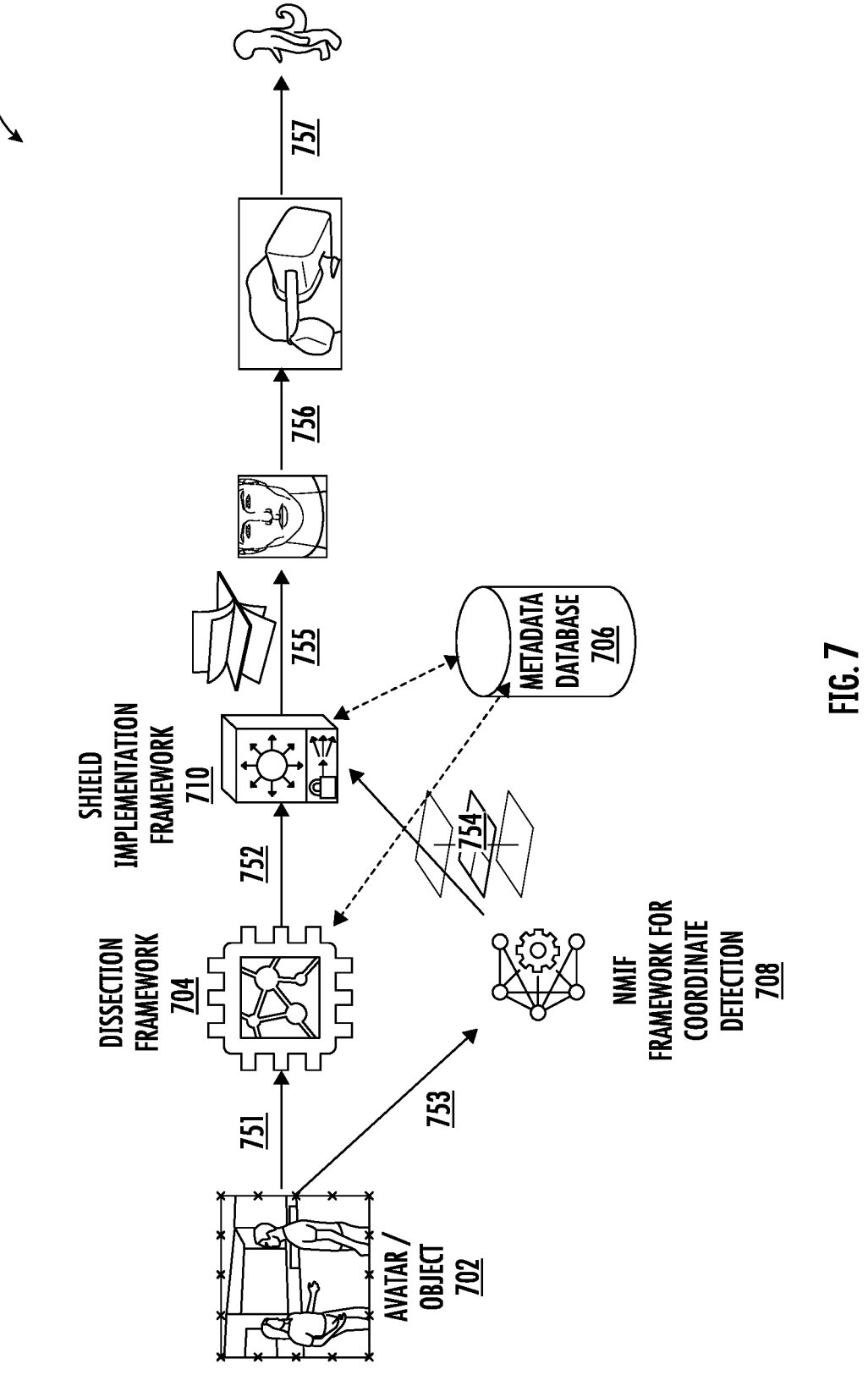

FIG. 7 illustrates another process flow for maintaining security of virtual objects in a distributed network, in accordance with an embodiment of the disclosure.

Figure 8:
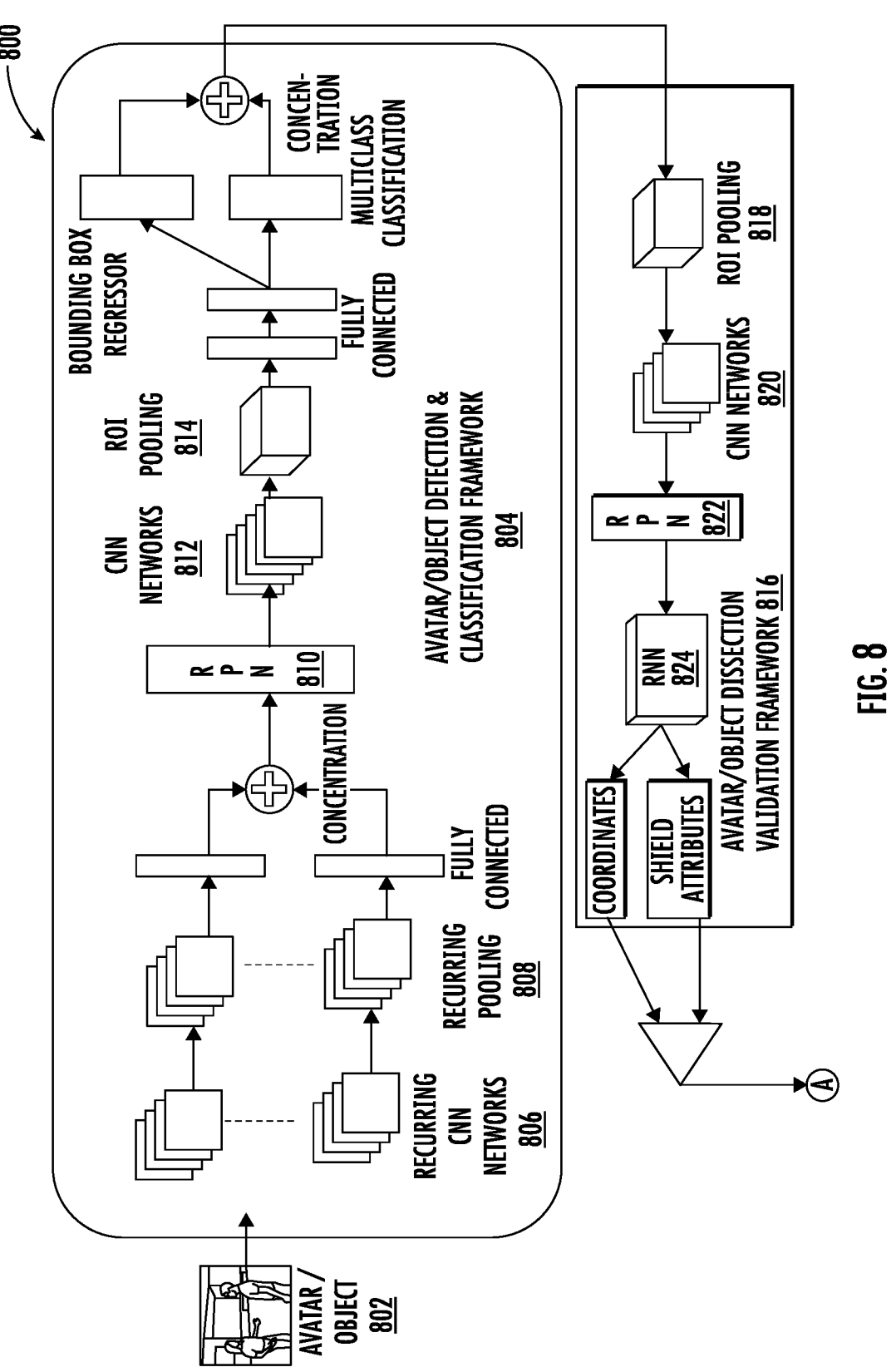

FIG. 8 illustrates another process flow for maintaining security of virtual objects in a distributed network, in accordance with an embodiment of the disclosure.

Figure 9:
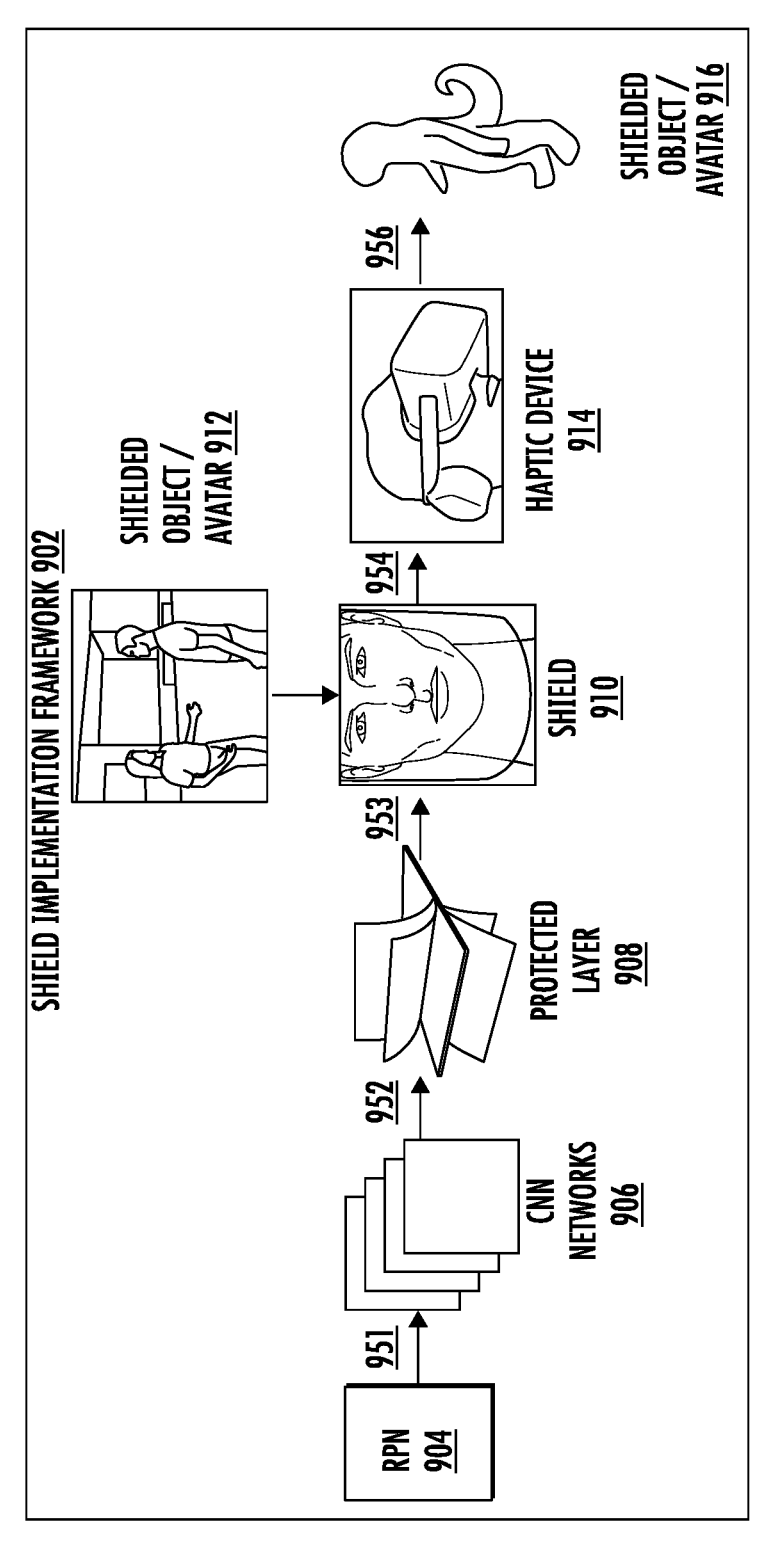

FIG. 9 illustrates another process flow for maintaining security of virtual objects in a distributed network, in accordance with an embodiment of the disclosure.

Figure 10:
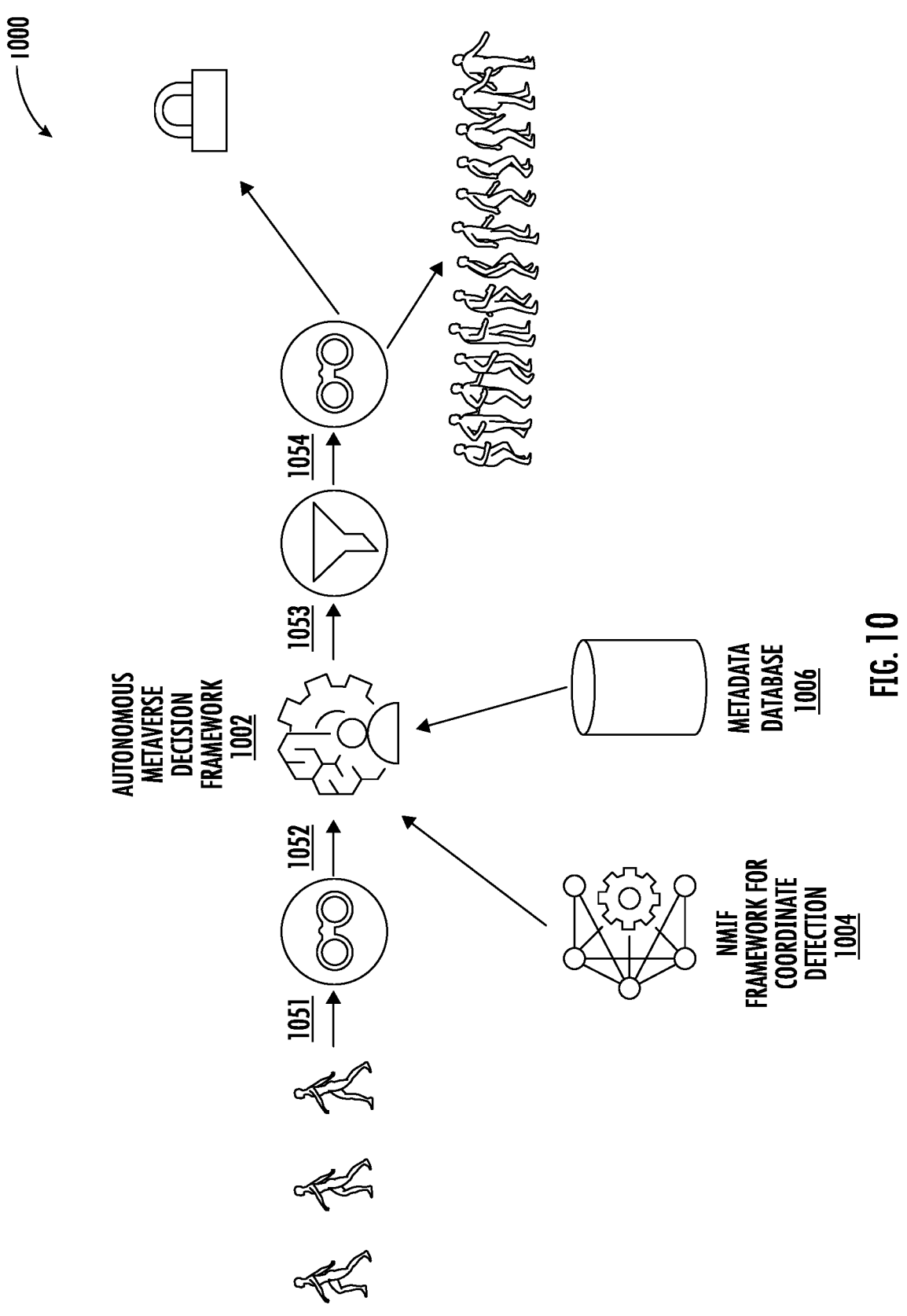

FIG. 10 illustrates another process flow for maintaining security of virtual objects in a distributed network, in accordance with an embodiment of the disclosure.

Figure 11:
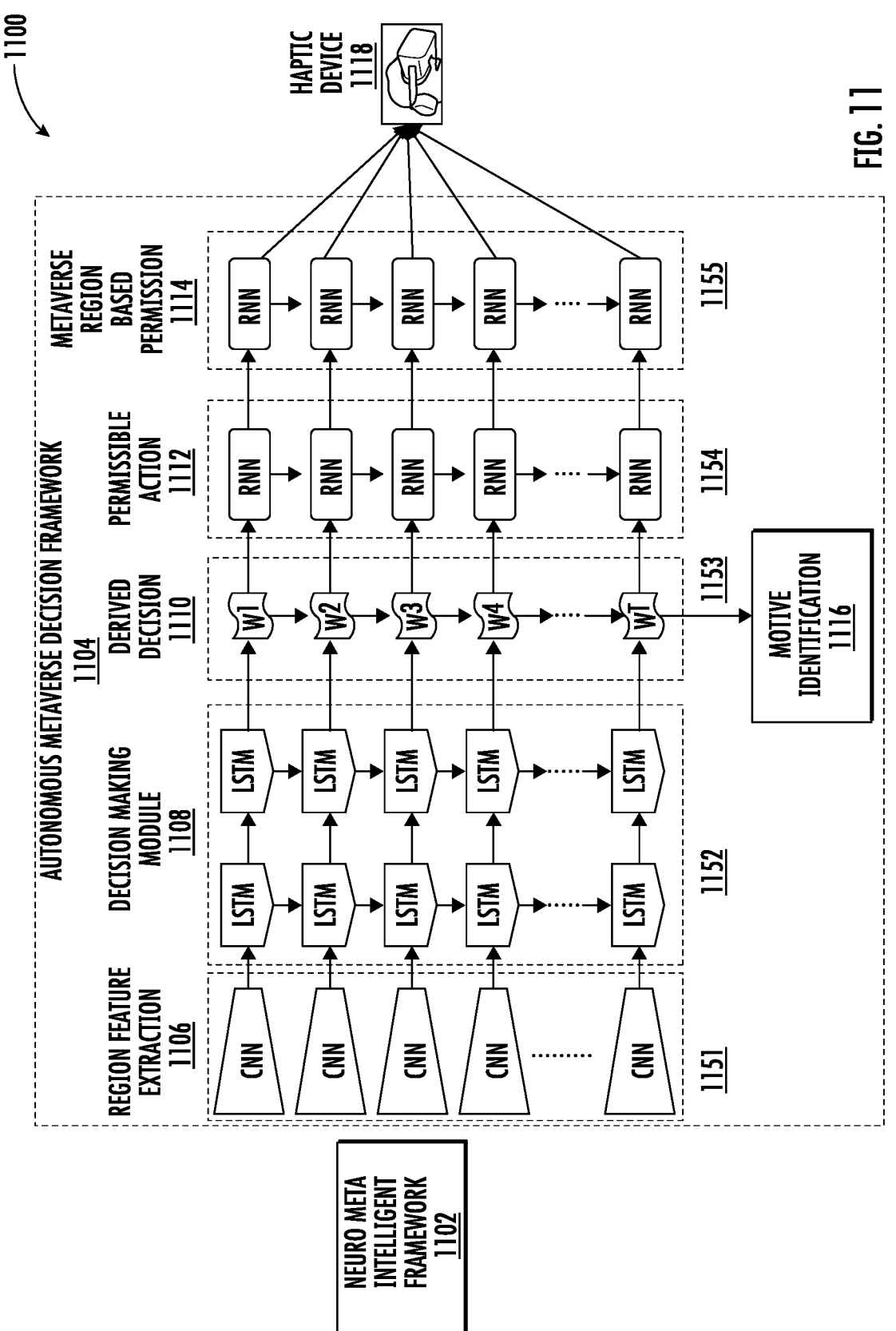

FIG. 11 illustrates another process flow for maintaining security of virtual objects in a distributed network, in accordance with an embodiment of the disclosure.

FIG. 12 illustrates another process flow for maintaining security of virtual objects in a distributed network, in accordance with an embodiment of the disclosure.

Figure 13:
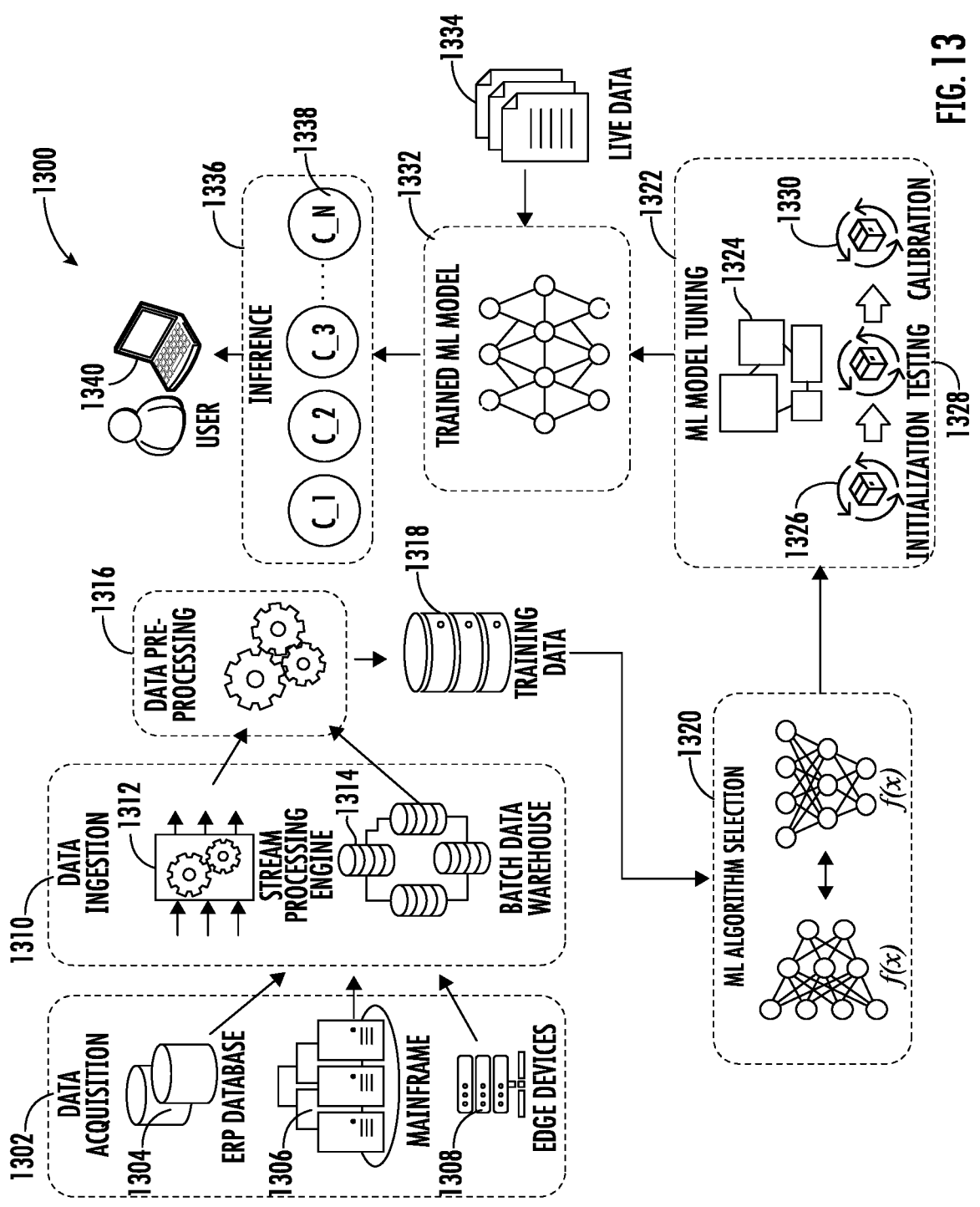

FIG. 13 illustrates an exemplary architecture of a machine learning (ML) subsystem, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored, and retrieved electronically using a computing device.

As used herein, a "resource transfer," "resource distribution," or "resource allocation" may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer," a "transaction," a "transaction event," or a "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

FIGS. 1A-1C illustrate technical components of an exemplary distributed computing environment 100 for maintaining security of virtual objects in a distributed network (e.g., a virtual world), in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and in some embodiments one or more of the systems, devices, and/or servers may be combined into a single system, device, and/or server, and/or be made up of multiple systems, devices, and/or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, and/or the like, various forms of digital computing devices, such as laptops, desktops, video recorders, audio/video players, radios, workstations, and/or the like, and/or any other auxiliary network devices, such as wearable devices, Internet-of-things devices, electronic kiosk devices, entertainment consoles, mainframes, and/or the like, and/or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, and/or the like. The network 110 may be secure and/or unsecure and may also include wireless and/or wired and/or optical interconnection technology.

The structure of the distributed computing environment and its components, connections and relationships, and their functions, are exemplary, and are not meant to limit implementations of the disclosures described and/or claimed herein. For example, the distributed computing environment 100 may include more, fewer, and/or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102 (e.g., a processing device), memory 104, a storage device 106, and an input/output (I/O) device 116. The system 130 may also include a high-speed interface 108 connecting to the memory 104, and a low-speed interface 112 connecting to low-speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. For example, the processor 102 may execute computer program code stored on a non-transitory storage device (e.g., the memory 104), which may cause the processor 102 to perform one or more of the process flows described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may include a computer-readable medium, such as a floppy disk device, a hard disk device, an optical disk device, a tape device, a flash memory, or other similar solid state memory device, and/or an array of devices, including devices in a storage area network or other configurations. A computer program product can be tangibly embodied in an information carrier. The computer program product may also contain instructions that, when executed, perform one or more methods, such as those described herein. The information carrier may be a computer-readable medium and/or a machine-readable medium, such as the memory 104, the storage device 106, and/or memory on processor 102.

The high-speed interface 108 manages bandwidth-intensive operations for the system 130, while the low-speed interface 112 (e.g., a low-speed controller) manages lower bandwidth-intensive operations. Such allocation of functions is exemplary. In some embodiments, the high-speed interface 108 is coupled to memory 104, the input/output (I/O) device 116 (e.g., through a graphics processor or accelerator), and high-speed expansion ports 111, which may accept various expansion cards. In some embodiments, the low-speed interface 112 may be coupled to the storage device 106 and the low-speed bus 114 (e.g., a low-speed expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device, such as a switch or router (e.g., through a network adapter).

The system 130 may be implemented in a number of different forms. For example, the system 130 may be implemented as a standard server, or multiple times in a group of such servers. In some embodiments, the system 130 may also be implemented as part of a rack server system or a personal computer such as a laptop computer. Additionally, or alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152 (e.g., a processing device), memory 154, an input/output device 156 (e.g., a display), a communication interface 158, and a transceiver 160, among other components. The end-point device(s) 140 may also be provided with a storage device, such as a microdrive or other device, to provide additional storage. Each of the components 152, 154, 156, 158, and 160, may be interconnected using various buses, cables, and/or the like and several of the components may be mounted on a common motherboard or in other manners as appropriate.

The processor 152 may be configured to execute instructions within the end-point device(s) 140, including instructions stored in the memory 154, which in one embodiment may include the instructions of an application that may perform the functions disclosed herein, including certain logic, data processing, and data storing functions. For example, the processor 152 may execute computer program code stored on a non-transitory storage device (e.g., the memory 154), which may cause the processor 152 to perform one or more of the process flows described herein. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and/or wireless communication by end-point device(s) 140.

The processor 152 may be configured to communicate with the user through a control interface 164 and a display interface 166 coupled to the input/output device 156. The input/output device 156 may be, for example, a TFT LCD (Thin-Film-Transistor Liquid Crystal Display) or an OLED (Organic Light Emitting Diode) display, or other appropriate display technology. The display interface 166 may include appropriate circuitry and be configured for driving the input/output device 156 to present graphical and other information to a user. The control interface 164 may receive commands from a user and convert them for submission to the processor 152. In addition, an external interface 168 may be provided in communication with the processor 152, so as to enable near area communication of end-point device(s) 140 with other devices. External interface 168 may provide, for example, for wired communication and/or wireless communication, and the end-point device(s) 140 may include multiple external interfaces 168. In some embodiments, the control interface 164 and/or the display interface 166 may include a heads-up display worn on the user's head, one or more devices worn by the user (e.g., on the user's hands), one or more devices held by the user (e.g., a controller device), and/or the like for rendering visual content, receiving input from the user, providing haptic feedback to the user, and/or the like. For example, the end-point device(s) 140 may be and/or include a virtual reality headset, a virtual reality system (e.g., including a headset and one or more accessories), and/or the like.

The memory 154 stores information within the end-point device(s) 140. The memory 154 may be implemented as one or more of a computer-readable medium or media, a volatile memory unit or units, and/or a non-volatile memory unit or units. Expansion memory may also be provided and connected to end-point device(s) 140 through an expansion interface, which may include, for example, a SIMM (Single In Line Memory Module) card interface. Such expansion memory may provide extra storage space for end-point device(s) 140 and may also store applications and/or other information therein. In some embodiments, expansion memory may include instructions to carry out or supplement the processes described herein and may include secure information. For example, expansion memory may be provided as a security module for end-point device(s) 140 and may be programmed with instructions that permit secure use of end-point device(s) 140. Additionally, or alternatively, secure applications may be provided via SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product may include instructions that, when executed, perform one or more methods, such as those described herein. The information carrier may be a computer-readable medium and/or a machine-readable medium, such as the memory 154, expansion memory, memory on the processor 152, and/or a propagated signal that may be received, for example, over transceiver 160 and/or external interface 168.

In some embodiments, a user may use the end-point device(s) 140 to transmit and/or receive information and/or commands to and/or from the system 130 via the network 110. Communication between the system 130 and the end-point device(s) 140 may be subject to an authentication protocol allowing the system 130 to maintain security by permitting only authenticated users and/or processes to access protected resources of the system 130, which may include servers, databases, applications, and/or any of the components described herein. To this end, the system 130 may trigger an authentication subsystem that may require the user and/or the process to provide authentication credentials to determine whether the user and/or the process is eligible to access the protected resources. Once the authentication credentials are validated and the user and/or the process is authenticated, the authentication subsystem may provide the user and/or the process with permissioned access to the protected resources. Similarly, the end-point device(s) 140 may provide the system 130 and/or other client devices permissioned access to the protected resources of the end-point device(s) 140, which may include a GPS (Global Positioning System) device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes and/or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. The communication interface 158 may provide for communications under various telecommunications standards (e.g., 2G, 3G, 4G, 5G, and/or the like) using their respective layered protocol stacks. These communications may occur through a transceiver 160, such as a radio-frequency transceiver. Short-range communication may occur, such as using a Bluetooth, Wi-Fi, or other such transceiver. GPS receiver module 170 may provide additional navigation-related and/or location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker (e.g., in a handset) of end-point device(s) 140. Such sound may include sound from voice telephone calls, may include recorded sound (e.g., voice messages, music files, and/or the like), and/or may include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

As noted, a virtual world or virtual space is a computer-simulated environment which may be populated by many users represented by personal avatars. The users may use the avatars to explore the virtual world simultaneously and independently, participate in its activities, communicate with others, interact with objects (e.g., virtual objects), and/or the like. Avatars may be textual, graphical representations, and/or live video avatars with auditory and touch sensations. Objects may include 2D and/or 3D virtual objects that may be carried by avatars in order to obtain details of the virtual world, such as customers and/or clients of an entity, information regarding customers and/or clients, confidential data, and/or the like, by interacting with a trusted and/or authorized avatar of an entity, such as a designated employee, a customer care executive, and/or the like. However, within a virtual world, avatars and objects may be visible to malicious actors, such that the malicious actor can interact with, damage, misappropriate, and/or the like other avatars and/or objects. Furthermore, a malicious actor may obtain and/or generate a malicious object and/or an unauthorized object that transforms into a replica avatar that can impersonate, capture, duplicate, and/or the like a trusted and/or authorized avatar. Such a replica avatar may be used to misdirect customers of the entity, generate negative publicity, provide misinformation, misappropriate information from customers, and/or the like.

Some embodiments of the present invention provide a solution to the aforementioned problems by securing, encapsulating, and/or delisting objects and/or avatars in the virtual world based on a perceived likelihood of malicious behavior associated with an avatar and/or an object, thereby preventing suspicious and/or malicious activity. In this way, embodiments of the present invention secure potential vulnerabilities in virtual worlds to maintain security of virtual worlds.

In some embodiments, a system may provide real-time rendering and shielding for an object and/or avatar to move into the virtual world based on pre-determined range coordinates in case a malicious avatar (or an avatar with a malicious object) deviates from a motive path within the virtual world. The system may generate a shield layer limiting the malicious avatar's viewing ability to a predetermined range of the surface area where an avatar and object are intending to move in and around. The system may perform real-time continuous mapping of the virtual world based on avatar entitlements to determine permissible ranges and visibility of objects and/or avatars in the virtual world. The system may perform real-time continuous rendering of the virtual world with integrated motion control and haptic devise to ensure security of the virtual world.

In some embodiments, the system may implement a method that uses a multidimensional approach to manage a large-scale virtual world that requires real-time security and protection. For example, the system may use a neuro meta intelligence framework (NMIF) that autonomously provides such security and protection. In some embodiments, the NMIF may include a haptic visual controller (e.g., a virtual reality system, a virtual reality headset, and/or the like) and a cognitive system, where the cognitive system has the ability to understand and detect anomalies through continued validation and evaluation of objects and/or objects in a virtual world that may be associated with a likelihood of causing breaches of one or more security protocols.

In some embodiments, the system may perform incognizant frame delusion to secure objects and/or avatars, which may be a smart and intelligent method for protecting objects and/or avatars within the virtual world using real-time rendering to shield confidential objects and/or avatars by hiding another avatar's views without any trace of the shielded (e.g., hidden) confidential objects and/or avatars. In conventional systems, an object or avatar may be protected by a shield, but a malicious actor may still attempt to interact with the shielded object or avatar because it is visible. In contrast, the incognizant frame delusion method may remove or delist protected objects and/or avatars from unauthorized viewing by continuous rendering of neighborhood and/or adjacent frames in the virtual world for the malicious actor. In this way, the malicious actor may view a normal environment within the virtual world and the method may redirect the malicious actor's attention away from the protected objects and/or avatars.

In some embodiments, the system may perform real-time hypothesized rendering of the viewing range of avatars. For example, the system may perform real-time continuous mapping of the virtual world based on an avatar's privileges (e.g., entitlements, permissions, and/or the like) and determine permissible ranges of view and visibility of objects and/or avatars. Additionally, or alternatively, the system may perform real-time continuous monitoring of the ranges of view when the avatar is moving through an environment in the virtual world. For example, the system may determine an avatar's ranges of view and visibility by calculating a dynamic range, possible access paths of the avatar, and associated coordinates (e.g., using the NMIF) and then determine permissible ranges of view and visibility based on the avatar's privileges.

In some embodiments, the system may build a shield layer to make a threshold impact for an avatar and/or an object. For example, the shield layer may include an individual subset of the environment of a virtual world, which is built for every exposure of an individual object or avatar within the environment. The system may modify the shield layer's adaptive nature with monitoring of the object and/or avatar based on changes of movement of the object and/or avatar. The signaling ability to the object from or to the environment is optimized or blocking according to a security protocol set for the environment. In some embodiments, the system may control the locomotion of the spatial mapping point under a threshold of the movement in the environment.

In some embodiments, the system may implement a motive path deviation controlling framework. For example, the system may identify and classify an avatar when the avatar enters the virtual world (e.g., using the NMIF), which may define coordinates and a direction for an avatar. If the avatar deviates from the motive path and/or an anomaly is detected and validated by an autonomous motive path framework, the system may re-establish the path for the avatar and reset the direction of the avatar using coordinates (e.g., from the NMIF).

What is more, the present disclosure provides a technical solution to a technical problem. As described herein, the technical problem includes consumption of computing resources due to malicious actors interacting with, damaging, misappropriating, and/or the like other avatars and/or objects in a virtual world and the computing resources required to rectify such unwanted acts in the virtual world. The technical problems also includes consumption of computing resources due to malicious actors obtaining and/or generating a malicious object and/or an unauthorized object that transforms into a replica avatar that can impersonate, capture, duplicate, and/or the like a trusted and/or authorized avatar and such a replica avatar being used to misdirect customers of the entity, generate negative publicity, provide misinformation, misappropriate information from customers, and/or the like. The technical solution presented herein allows for automatic, on-site, real-time, processing of motives of users associated with avatars in a virtual world and the generation of content to prevent malicious actors from being able to view, much less interact with, information, objects, and/or avatars to which they are not intended to have access, which eliminates opportunities for malicious activity.

In some embodiments, the system may detect the entrance of an avatar into a virtual world and use one or more artificial intelligence engines and/or machine learning models to determine the motives of a user associated with the avatar (e.g., what the user intends to do within the virtual world). The system may determine the various paths within the virtual world that the avatar may take to carry out the motives and the viewing angles of the avatar along the paths. The system may use one or more artificial intelligence engines and/or machine learning models to generate user-specific content to be rendered in the virtual world for the avatar based on the user's privileges. For example, if the user is authorized or approved to open a new credit card account, the user-specific content may include various credit card offers that the user can select with the avatar in the virtual world. However, if the user is not authorized to open a new credit card account, the user-specific content may not include the credit card offers and the virtual world may be rendered as if the offers did not exist. In other words, the user-specific content may make the virtual world appear normal to the user despite the fact that objects or information are missing from the virtual world. By rendering this user-specific content, the system may prevent malicious actors from knowing that objects or information with which they are not authorized to interact or view exist in the virtual world.

FIG. 2 illustrates a process flow 200 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 200.

As shown in block 202, the process flow 200 may include an avatar and/or an object entering a virtual world. For example, an avatar may be associated with a user that is wearing and/or using a virtual reality system, a virtual reality headset, and/or any other type of computing device capable of accessing the virtual world. In some embodiments, the avatar may acquire an object that previously was not in the virtual world, and the process flow 200 may be initiated when the avatar enters the virtual world with the object.

As show in block 204, the process flow 200 may include validating attributes and/or a range of accessible areas for the avatar and/or the object based on privileges of the avatar and/or the object. For example, the process flow 200 may include accessing and/or retrieving data from one or more data structures storing data regarding avatars and/or objects to identify privileges and/or attributes of the avatar and/or the object that entered the virtual world.

As shown in block 206, the process flow 200 may include constructing a shield layer for the avatar and/or the object. For example, the process flow 200 may include constructing the shield layer based on the privileges of the avatar and/or the object. In some embodiments, the shield layer may permit the avatar and/or the object to view content, such as objects, virtual spaces (e.g., rooms, buildings, pathways, roadways, and/or the like), objects, avatars, information, and/or the like, within the virtual world that, based on the privileges, the avatar and/or the object may view and prevent the avatar and/or the object from viewing content (e.g., objects, objects, avatars, information, and/or the like) within the virtual world that, based on the privileges, the avatar and/or the object may not view.

As shown in block 208, the process flow 200 may include continuously monitoring and detecting, using the shield layer, anomalies for the avatar and/or the object. For example, the process flow 200 may include continuously monitoring and detecting anomalies such as access violations, visibility violations, suspicious behaviors, suspicious activities, and/or the like.

As shown in block 210, the process flow 200 may include blocking and/or notifying the avatar and/or the object in response to detecting malicious activity. For example, the process flow 200 may include preventing the avatar and/or the object from viewing and/or interacting with an object, viewing and/or entering a virtual space, viewing and/or interacting with an object, viewing and/or interacting with an avatar, viewing and/or interacting information, and/or the like.

As will be appreciated by one of ordinary skill in the art in view of the present disclosure, the process flow 200 may include additional steps, alternative steps, and/or the like. The process flow 200 may include additional embodiments, such as any single embodiment or any combination of embodiments described herein. Although FIG. 2 shows example blocks of the process flow 200, in some embodiments, the process flow 200 may include additional blocks, fewer blocks, different blocks, or differently arranged blocks than those depicted in FIG. 2. Additionally, or alternatively, two or more of the blocks of the process flow 200 may be performed in parallel.

FIG. 3 illustrates a process flow 300 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 300.

As shown in block 302, the process flow 300 may include an avatar and/or an object entering a virtual world. For example, an avatar may be associated with a user that is wearing and/or using a virtual reality system, a virtual reality headset, and/or any other type of computing device capable of accessing the virtual world. In some embodiments, the avatar may acquire an object that previously was not in the virtual world, and the process flow 300 may be initiated when the avatar enters the virtual world with the object.

As shown in block 304, the process flow 300 may include obtaining attributes of the avatar and/or the object from a database. For example, the process flow 300 may include accessing and/or retrieving data from one or more data structures storing data regarding avatars and/or objects to identify privileges and/or attributes of the avatar and/or the object that entered the virtual world.

As shown in block 306, the process flow 300 may include determining possible access paths based on virtual access requirements and motive of the avatar. For example, the process flow 300 may include determining virtual access requirements and/or motive of a user associated with the avatar based on the attributes obtained from the database. In such an example, the process flow 300 may include determining one or more likelihoods of the avatar traveling along one or more access paths in the virtual world.

As shown in block 308, the process flow 300 may include predicting viewing angles with coordinates for the possible access paths based on the avatar's and/or the object's access report and restrictions. For example, the process flow 300 may include determining which content, such as objects, virtual spaces (e.g., rooms, buildings, pathways, roadways, and/or the like), objects, avatars, information, and/or the like, within the virtual world that, based on the privileges, within the viewing angles of the possible access paths the avatar and/or the object may view and which content the avatar and/or the object may not view.

As shown in block 310, the process flow 300 may include mapping viewing angle coordinates and avatar motion paths. For example, the process flow 300 may include determining the coordinates in the virtual world of the avatar's and/or the object's viewing angles and motion paths along the possible access paths.

As shown in block 312, the process flow 300 may include providing the mapped viewing angle coordinates and avatar motion paths to an avatar visibility controller for integration with a haptic device for viewing. For the example, the haptic device may include a virtual reality system, a virtual reality headset, and/or another type of computing device executing the avatar visibility controller.

As shown in block 314, the process flow 300 may include providing an actual virtual image to the avatar visibility controller. For example, the actual virtual image may include all of the content within the virtual word along the viewing angles and the possible access paths.

As shown in block 316, the process flow 300 may include performing spatial mapping in a spatial layer, an interaction layer, and a physical layer using the avatar visibility controller. For example, the process flow 300 may include using the avatar visibility controller to determine, within the spatial layer, the interaction layer, and the physical layer of the virtual world, all of the content within the virtual word along the viewing angles and the possible access paths.

As shown in block 318, the process flow 300 may include rendering and integrating a customized view with a specific report of the avatar. For example, the process flow 300 may include altering the actual virtual image within the spatial layer, the interaction layer, and the physical layer of the virtual world to only include content the avatar and/or the object may view according to the avatar's and/or the object's access report and restrictions.

As shown in block 320, the process flow 300 may include displaying the customized view for the avatar. For example, the process flow 300 may include displaying the customized view to the user associated with the avatar (e.g., using a virtual reality system, a virtual reality headset, and/or another type of computing device including a display).

As shown in block 322, the process flow 300 may include continuously monitoring to detect anomalies or suspicious behavior. For example, the process flow 300 may include continuously monitoring and detecting anomalies such as access violations, visibility violations, suspicious behaviors, suspicious activities, and/or the like. In some embodiments, the process flow 300 may include repeating blocks 306-322 while the avatar and/or the object is in the virtual world (e.g., until the user disconnects, logs out, and/or the like).

As will be appreciated by one of ordinary skill in the art in view of the present disclosure, the process flow 300 may include additional steps, alternative steps, and/or the like. The process flow 300 may include additional embodiments, such as any single embodiment or any combination of embodiments described herein. Although FIG. 3 shows example blocks of the process flow 300, in some embodiments, the process flow 300 may include additional blocks, fewer blocks, different blocks, or differently arranged blocks than those depicted in FIG. 3. Additionally, or alternatively, two or more of the blocks of the process flow 300 may be performed in parallel.

FIG. 4 illustrates a process flow 400 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 400.

As shown in FIG. 4, the process flow 400 includes an avatar 402, a virtual world 404, a neuro meta intelligent framework (NMIF) 406, an avatar metadata database 408, a proxy shield layer 410, an avatar visibility controller 412, an actual frame 414, and a customized view. As also shown in FIG. 4, the process flow 400 may include the blocks 302-322 of the process flow 300 shown and described herein with respect to FIG. 3.

For example, the process flow 400 may include the avatar 402 entering the virtual world 404 as shown in block 302 of FIG. 3. In some embodiments, the avatar 402 may have an object when entering the virtual world 404, and the process flow 400 may be triggered based on the avatar 402 entering the virtual world 404 and/or the object entering the virtual world 404.

As shown in FIG. 4, the process flow 400 may include obtaining attributes of the avatar and/or the object from the avatar metadata database 408 in a manner similar to that described herein with respect to block 304 of FIG. 3. For example, the NMIF 406 may obtain the attributes of the avatar and/or the object from the avatar metadata database 408.

As shown in FIG. 4, the process flow 400 may include determining possible access paths based on virtual access requirements and motive of the avatar 402 in a manner similar to that described herein with respect to block 306 of FIG. 3. For example, the NMIF 406 may determine the possible access paths based on virtual access requirements and motive of the avatar 402.

As shown in FIG. 4, the process flow 400 may include predicting viewing angles with coordinates for the possible access paths based on the avatar's and/or the object's access report and restrictions in a manner similar to that described herein with respect to block 308 of FIG. 3 to generate the proxy shield layer 410. For example, the NMIF 406 may predict viewing angles with coordinates for the possible access paths based on the avatar's and/or the object's access report and restrictions and/or generate the proxy shield layer 410.

As shown in FIG. 4, the process flow 400 may include mapping viewing angle coordinates and avatar motion paths in the virtual world 404 in a manner similar to that described herein with respect to block 310 of FIG. 3. For example, the NMIF 406 may map viewing angle coordinates and avatar motion paths in the virtual world 404 using the determined possible access paths and the proxy shield layer 410.

As shown in FIG. 4, the process flow 400 may include providing the mapped viewing angle coordinates and avatar motion paths to an avatar visibility controller for integration with a haptic device for viewing in a manner similar to that described herein with respect to block 312 of FIG. 3. For example, the NMIF 406 may provide the mapped viewing angle coordinates and avatar motion paths to an avatar visibility controller for integration with a haptic device for viewing.

As shown in FIG. 4, the process flow 400 may include providing the actual frame 414 in the virtual world with confidential information to the avatar visibility controller 412 in a manner similar to that described herein with respect to block 314 of FIG. 3. For example, the actual frame 414 may include all of the content within the virtual word along the viewing angles and the possible access paths.

As shown in FIG. 4, the process flow 400 may include performing, using the avatar visibility controller 412, spatial mapping in a spatial layer, an interaction layer, and a physical layer in a manner similar to that described herein with respect to block 316 of FIG. 3. For example, the process flow 400 may include using the avatar visibility controller 412 to determine, within the spatial layer, the interaction layer, and the physical layer of the virtual world, all of the content within the virtual word along the viewing angles and the possible access paths.

As shown in FIG. 4, the process flow 400 may include rendering and integrating the customized view 416 with a specific report of the avatar in a manner similar to that described herein with respect to block 318 of FIG. 3. For example, the process flow 400 may include altering the actual frame 414 within the spatial layer, the interaction layer, and the physical layer of the virtual world to only include content the avatar and/or the object may view according to the avatar's and/or the object's access report and restrictions.

As shown in FIG. 4, the process flow 400 may include displaying the customized view for the avatar 402 in a manner similar to that described herein with respect to block 320 of FIG. 3. For example, the process flow 400 may include displaying the customized view to the user associated with the avatar 402 (e.g., using a virtual reality system, a virtual reality headset, and/or another type of computing device including a display). In some embodiments, aspects and/or parts of the virtual world will be hidden to the user and/or the avatar; however, due to the continuous rendering (e.g., by the proxy shield layer 410, the NMIF 406, and/or the avatar visibility controller 412) the user and/or the avatar may not be able to detect the hidden aspects and/or parts. In other words, for the user and/or the avatar, the virtual world may appear to be normal.

As shown in FIG. 4, the process flow 400 may include continuously monitoring to detect anomalies or suspicious behavior in a manner similar to that described herein with respect to block 322 of FIG. 3. For example, the process flow 400 may include continuously monitoring and detecting anomalies such as access violations, visibility violations, suspicious behaviors, suspicious activities, and/or the like. In some embodiments, the process flow 400 may include repeating the steps described herein while the avatar 402 and/or the object is in the virtual world 404 (e.g., until the user disconnects, logs out, and/or the like).

As will be appreciated by one of ordinary skill in the art in view of the present disclosure, the process flow 400 may include additional steps, alternative steps, and/or the like. The process flow 400 may include additional embodiments, such as any single embodiment or any combination of embodiments described herein. Although FIG. 4 shows example steps of the process flow 400, in some embodiments, the process flow 400 may include additional steps, fewer steps, different steps, or differently arranged steps than those depicted in FIG. 4. Additionally, or alternatively, two or more of the steps of the process flow 400 may be performed in parallel.

FIG. 5 illustrates a process flow 500 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 500.

As shown in FIG. 5, the process flow 500 may include a neuro meta intelligent framework (NMIF) 504 generating, based on a frame 506 being viewed by an avatar and/or a user associated with the avatar, an access path 524 and a proxy shield layer 548. In some embodiments, the NMIF 504 may be similar to other NMIFs described herein (e.g., with respect to other process flows). In other words, the NMIF 504 may predict and/or forecast the access path 524 of the avatar and associated coordinates such that the proxy shield layer 548 may be formed.

As also shown in FIG. 5, the NMIF 504 may include and/or generate a convolution neural network (CNN) 508 with iterative (N times) hidden layers including a top hidden layer 510, unary potentials 512, message passing 514, a compatibility transform 516, bottom hidden layer 519, and an output 522. The process flow 500 may include building (e.g., using the NMIF 504) the CNN 508 based on the purpose and intent of a user associated with an avatar to output from a Softmax layer a sequence of all possible access paths of the avatar. Each of the attributes of the avatar may be passed as input to the NMIF 504 and/or the CNN 508 and the CNN 508 may be tuned using the iterative procedure.

As shown in FIG. 5, the NMIF 504 may include and/or generate another CNN in combination with a rectified linear activation function (ReLU) 532, a pooling step 534, an additional CNN in combination with another ReLU 536, additional pooling steps 538 and 540, a flattening step 542, a fully connected step 544, and a Softmax layer 546. The process flow 500 may include building (e.g., using the NMIF 504) the CNN in combination with the ReLU 532 to predict coordinates and the pooling step 534 to filter and tune the coordinates. The process flow 500 may include repeating the pooling in the additional pooling steps 538 and 540 N times such that the error rate becomes almost null. The process flow 500 may include performing the flattening step 542 on the iterative CNN and ReLU with pooling and then fully connecting it to nullify the error rate in the fully connected step 544. The process flow 500 may include providing the output to the Softmax layer 546 to obtain the geometric coordinates for an avatar and/or an object.

As will be appreciated by one of ordinary skill in the art in view of the present disclosure, the process flow 500 may include additional steps, alternative steps, and/or the like. The process flow 500 may include additional embodiments, such as any single embodiment or any combination of embodiments described herein. Although FIG. 5 shows example steps of the process flow 500, in some embodiments, the process flow 500 may include additional steps, fewer steps, different steps, or differently arranged steps than those depicted in FIG. 5. Additionally, or alternatively, two or more of the steps of the process flow 500 may be performed in parallel.

FIG. 6 illustrates a process flow 600 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 600.

As shown in FIG. 6, the process flow 600 may include a neuro meta intelligent framework (NMIF) 602 including a first spatial CNN 604, a first long short-term memory (LSTM) framework 606 (e.g., including multiple LSTMs), a second spatial CNN 608, a second LSTM framework 610 (e.g., including multiple LSTMs), a fully connected CNN 612, and an aggregator 614. As also shown in FIG. 6, the process flow 600 may include providing viewing angle-based frames 616 and motion-based frames 618 to the NMIF 602. Additionally, or alternatively, the process flow 600 may include receiving and/or obtaining the viewing angle-based frames 616 and motion-based frames 618 with the NMIF 602. As shown in FIG. 6, the process flow 600 may include using the NMIF 602 to determine a future avatar motion state 620.

In some embodiments, the process flow 600 may include using the NMIF 602 to predict and/or forecast all of the future avatar motion states. As shown in FIG. 6, the process flow 600 may include using the first spatial CNN 604 and the first LSTM framework 606 to process the viewing angle-based frames 616 and using the second spatial CNN 608 and the second LSTM framework 610 to process the motion-based frames 618. For example, the first spatial CNN 604 may detect, based on the viewing angle-based frames 616, all possible viewing angles of an avatar and provide them to the first LSTM framework 606, which forecasts and/or predicts future views of the avatar. As another example, the second spatial CNN 608 may determine, based on the motion-based frames 618, all possible movements of the avatar and provide them to the second LSTM framework 610, which forecasts and/or predicts future movements of the avatar.

As shown in FIG. 6, the process flow 600 may include providing the future views of the avatar and the future movements of the avatar to the fully connected CNN 612. In some embodiments, the fully connected CNN 612 may include a deep neural network, a recurrent neural network (RNN), and/or the like. The process flow 600 may include processing, using the fully connected CNN 612, the future views of the avatar and the future movements of the avatar to reduce their error rate and increase their accuracy.

As shown in FIG. 6, the process flow 600 may include providing the processed future views of the avatar and the processed future movements of the avatar output from the fully connected CNN 612 to the aggregator 614. In some embodiments, the process flow 600 may include evaluating, using the aggregator 614, the output from the fully connected CNN 612 to reduce the error rate of the future avatar motion state 620.

As will be appreciated by one of ordinary skill in the art in view of the present disclosure, the process flow 600 may include additional steps, alternative steps, and/or the like. The process flow 600 may include additional embodiments, such as any single embodiment or any combination of embodiments described herein. Although FIG. 6 shows example blocks of the process flow 600, in some embodiments, the process flow 600 may include additional blocks, fewer blocks, different blocks, or differently arranged blocks than those depicted in FIG. 6. Additionally, or alternatively, two or more of the blocks of the process flow 600 may be performed in parallel.

FIG. 7 illustrates a process flow 700 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 700.

As shown in FIG. 7, the process flow 700 may include an avatar and/or an object 702 entering a virtual world. For example, an avatar may be associated with a user that is wearing and/or using a virtual reality system, a virtual reality headset, and/or any other type of computing device capable of accessing the virtual world. In some embodiments, the avatar may acquire an object that previously was not in the virtual world, and the process flow 700 may be initiated when the avatar enters the virtual world with the object.

As also shown in FIG. 7, the process flow 700 may include a dissection framework 704, a metadata database 706, a neuro meta intelligent framework (NMIF) 708, and a shield implementation framework 710. In some embodiments, the dissection framework 704, the metadata database 706, the neuro meta intelligent framework (NMIF) 708, and the shield implementation framework 710 may be similar to other frameworks and databases and/or data structures described herein.

As shown in FIG. 7, the process flow 700 may include step 751 of dissecting, using the dissection framework 704 and in response to the avatar and/or the object 702 entering the virtual world, each dimension of the avatar and/or the object 702 and classifying a corresponding shield for each of the dimensions. In some embodiments, and as shown in FIG. 7, the process flow 700 may include accessing the metadata database 706 to dissect each dimension of the avatar and/or the object 702 and classify the corresponding shield for each of the dimensions. In some embodiments, and as shown in FIG. 7, the process flow 700 may include step 752 of providing the dimensions of the avatar and/or the object 702 and the corresponding shields to the shield implementation framework 710.

As shown in FIG. 7, the process flow 700 may include step 753 of determining, using the NMIF 708, motive of a user associated with the avatar and/or the object 702 (e.g., in a manner similar to that described herein with respect to FIG. 3). In some embodiments, step 752 of the process flow may further include determining, using the NMIF 708, coordinates for the avatar and/or the object 702 (e.g., in a manner similar to that described herein with respect to FIG. 3). In some embodiments, and as shown in FIG. 7, the process flow 700 may include step 754 of providing the intent and the coordinates for the avatar and/or the object 702 to the shield implementation framework 710.

As shown in FIG. 7, the process flow 700 may include step 755 of generating, using the shield implementation framework 710 and based on the dimensions, intent, coordinates, attributes, and/or the like of the avatar and/or the object 702, a customized shield for the avatar and/or the object 702. In some embodiments, the process flow 700 may include the shield implementation framework 710 accessing the metadata database 706 to determine attributes of the avatar and/or the object 702 as shown in FIG. 7.

As also shown in FIG. 7, the process flow 700 may include step 756 of mapping (e.g., with a visual controller, such as a virtual reality headset) the customized shield for the avatar and/or the object 702 to the environment. Finally, the process flow 700 may include step 757 of rendering content including the customized shield for the avatar and/or the object 702 and displaying the content to a user (e.g., associated with the avatar and/or the object 702).

As will be appreciated by one of ordinary skill in the art in view of the present disclosure, the process flow 700 may include additional steps, alternative steps, and/or the like. The process flow 700 may include additional embodiments, such as any single embodiment or any combination of embodiments described herein. Although FIG. 7 shows example steps of the process flow 700, in some embodiments, the process flow 700 may include additional steps, fewer steps, different steps, or differently arranged steps than those depicted in FIG. 7. Additionally, or alternatively, two or more of the steps of the process flow 700 may be performed in parallel.

FIG. 8 illustrates a process flow 800 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 800.

As shown in FIG. 8, the process flow 800 may include an avatar and/or an object 802 entering a virtual world. For example, an avatar may be associated with a user that is wearing and/or using a virtual reality system, a virtual reality headset, and/or any other type of computing device capable of accessing the virtual world. In some embodiments, the avatar may acquire an object that previously was not in the virtual world, and the process flow 800 may be initiated when the avatar enters the virtual world with the object.

As shown in FIG. 8, the process flow 800 may include an avatar/object detection and classification framework 804 that includes recurring CNN networks 806, recurring pooling 808, a region proposal network (RPN) 810, CNN networks 812, and region of interest (ROI) pooling 814. As also shown in FIG. 8, the process flow 800 may include an avatar/object dissection validation framework 816 that includes ROI pooling 818, CNN networks 820, an RPN 822, and an RNN 824.

In some embodiments, the avatar/object detection and classification framework 804 may be used to detect and/or identify different dimensions of avatars and/or types of shields for each dimension. Additionally, or alternatively, the avatar/object dissection validation framework 816 may be used to generate coordinate positions of each dimension of classified shield on the avatar/object.

As shown in FIG. 8, the process flow 800 may include determining, using the recurring CNN networks 806, coordinates (e.g., X, Y, and X coordinates) of the environment and/or objects of the virtual world. In some embodiments, and as shown in FIG. 8, the process flow 800 may include reducing, using the recurring pooling 808, an error rate of the determination of the coordinates.

As shown in FIG. 8, the process flow 800 may include predicting, using the RPN 810, bounds and scores at each position for the avatar and/or the object 802, other objects within the virtual world, elements (e.g., objects) within the environment of the virtual world, and/or the like. In some embodiments, and as shown in FIG. 8, the process flow 800 may include filtering, using the CNN networks 812, noise from the RPN 810.

As shown in FIG. 8, the process flow 800 may include extracting, using the ROI pooling 814, specific features of attributes of the avatar and/or the object 802. In some embodiments, and as shown in FIG. 8, the process flow 800 may include passing the specific features of attributes of the avatar and/or the object 802 through one or more fully connected layers.

As shown in FIG. 8, the process flow 800 may include classifying, using multiclass classification and/or a bounding box regressor, the specific features of attributes of the avatar and/or the object 802. In some embodiments, and as shown in FIG. 8, the process flow 800 may include concatenating the specific features of attributes of the avatar and/or the object 802. Additionally, or alternatively, the process flow 800 may include selecting, based on the classification of the specific features of the attributes of the avatar and/or the object 802, a type of shield.

As shown in FIG. 8, the process flow 800 may include providing the selected type of shield and/or the attributes of the avatar and/or the object 802 to the avatar/object dissection validation framework 816. In some embodiments, and as shown in FIG. 8, the process flow 800 may include validating, using the ROI pooling 818, that the attributes of the avatar and/or the object 802 match the selected type of shield and/or vice versa.

As shown in FIG. 8, the process flow 800 may include constructing and mapping, using the CNN networks 820 and the RPN 822, a shield layer. In some embodiments, and as shown in FIG. 8, the process flow 800 may include predicting, using the RNN 824, the coordinates and attributes to build the shield layer.

As will be appreciated by one of ordinary skill in the art in view of the present disclosure, the process flow 800 may include additional steps, alternative steps, and/or the like. The process flow 800 may include additional embodiments, such as any single embodiment or any combination of embodiments described herein. Although FIG. 8 shows example steps of the process flow 800, in some embodiments, the process flow 800 may include additional steps, fewer steps, different steps, or differently arranged steps than those depicted in FIG. 8. Additionally, or alternatively, two or more of the steps of the process flow 800 may be performed in parallel.

FIG. 9 illustrates a process flow 900 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 900.

In some embodiments, the process flow 900 may follow the process flow 800 shown and described herein with respect to FIG. 8. For example, process flow 900 may include receiving the coordinates and attributes of the shield layer (e.g., from the avatar/object dissection validation framework 816).

As shown in FIG. 9, the process flow 900 may include a shield implementation framework 902 that includes an RPN 904, CNN networks 906, a protected layer 908, a shield 910, a shielded object/avatar 912, a haptic device, and a shielded object/avatar 916. In some embodiments, the process flow 900 may include receiving, using the RPN 904, the coordinates and attributes of the shield layer, building, using the RPN 904, a shield on respective dimensions, and step 951 of providing the shield to the CNN networks 906.

As shown in FIG. 9, the process flow 900 may include step 952 of creating, using the CNN networks 906, the protected layer 908. In some embodiments, and as shown in FIG. 9, the process flow 900 may include step 953 of generating content for the environment of the virtual world using the shielded object/avatar 912 and the shield 910. For example, the process flow 900 may include generating content that includes the shield 910 obscuring and/or altering views and/or abilities to interact with the shielded object/avatar 912.

As shown in FIG. 9, the process flow 900 may include step 954 of providing the content including the shielded object/avatar 912 with the shield 910 applied to the haptic device 914 (e.g., a virtual reality headset, a virtual reality system, and/or the like). In some embodiments, and as shown in FIG. 9, the process flow 900 may include step 956 of rendering the content including the shielded object/avatar 912 with the shield 910 applied using the haptic device 914. For example, the process flow 900 may include rendering the content using the haptic device 914 such that a user cannot view and/or interact with the shielded object/avatar (e.g., the shielded object/avatar 912 with the shield 910 applied) in the virtual world, where the virtual world appears normal to the user such that the user cannot determine that the shield 910 has been applied.

As will be appreciated by one of ordinary skill in the art in view of the present disclosure, the process flow 900 may include additional steps, alternative steps, and/or the like. The process flow 900 may include additional embodiments, such as any single embodiment or any combination of embodiments described herein. Although FIG. 9 shows example steps of the process flow 900, in some embodiments, the process flow 900 may include additional steps, fewer steps, different steps, or differently arranged steps than those depicted in FIG. 9. Additionally, or alternatively, two or more of the steps of the process flow 900 may be performed in parallel.

FIG. 10 illustrates a process flow 1000 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 1000.

As shown in FIG. 10, the process flow 1000 may include an autonomous metaverse decision framework 1002, an NMIF framework for coordinate detection 1004, and a metadata database 1006. In some embodiments, the autonomous metaverse decision framework 1002, the NMIF framework for coordinate detection 1004, and the metadata database 1006 may be similar to other frameworks and databases and/or data structures described herein.

As shown in FIG. 10, the process flow 1000 may include step 1051 of an avatar and/or an object entering a virtual world. For example, an avatar may be associated with a user that is wearing and/or using a virtual reality system, a virtual reality headset, and/or any other type of computing device capable of accessing the virtual world. In some embodiments, the avatar may acquire an object that previously was not in the virtual world, and the process flow 1000 may be initiated when the avatar enters the virtual world with the object.

As shown in FIG. 10, the process flow 1000 may include step 1052 of determining, using the NMIF framework for coordinate detection 1004, an intent and/or motive of a user associated with the avatar and/or the object and determining, using the NMIF, coordinates of an access path associated with the intent and/or the motive of the user. In some embodiments, and as shown in FIG. 10, the process flow 1000 may include providing the intent and/or the motive of the user and the coordinates of the access path to the autonomous metaverse decision framework 1002.

As shown in FIG. 10, the process flow 1000 may include detecting, using the autonomous metaverse decision framework 1002, anomalies and/or diversions from the access path by the avatar and/or the object. In some embodiments, the process flow 1000 may include obtaining attributes of the avatar and/or the object from the metadata database 1006 in a manner similar to that described herein with respect to block 304 of FIG. 3. For example, the autonomous metaverse decision framework 1002 may obtain the attributes of the avatar and/or the object from the avatar metadata database 1006.

In some embodiments, the process flow 1000 may include determining, using the autonomous metaverse decision framework 1002 and based on the attributes of the avatar and/or the object from the avatar metadata database 1006, an updated intent and/or the motive of the user. As shown in FIG. 1000, the process flow 1000 may include step 1053 of determining, using the autonomous metaverse decision framework 1002, based on the attributes of the avatar and/or the object from the avatar metadata database 1006, and based on the updated intent and/or the motive of the user, whether a detected anomaly and/or diversion from the access path is a permissible access path. For example, the process flow 1000 may include filtering, based on the attributes of the avatar and/or the object from the avatar metadata database 1006 and based on the updated intent and/or the motive of the user, all possible paths to determine whether the detected anomaly and/or diversion from the access path is a permissible access path.

As shown in FIG. 10, the process flow 1000 may include step 1054 of restricting, based on determining that the detected anomaly and/or diversion from the access path is not a permissible access path, movement of the avatar within the virtual world. In some embodiments, and as shown in FIG. 10, the process flow 1000 may include permitting, based on determining that the detected anomaly and/or diversion from the access path is a permissible access path, movement of the avatar within the virtual world.

In some embodiments, the process flow 1000 may include providing, to a visual controller (e.g., a virtual reality system, a virtual reality headset, and/or the like), new coordinates for the avatar, new shield layers for avatars and/or objects within the virtual world, and/or the like based on the determination of the autonomous metaverse decision framework 1002. Additionally, or alternatively, the process flow 1000 may include generating content for display to the user that includes the new shield layers.

As will be appreciated by one of ordinary skill in the art in view of the present disclosure, the process flow 1000 may include additional steps, alternative steps, and/or the like. The process flow 1000 may include additional embodiments, such as any single embodiment or any combination of embodiments described herein. Although FIG. 10 shows example steps of the process flow 1000, in some embodiments, the process flow 1000 may include additional steps, fewer steps, different steps, or differently arranged steps than those depicted in FIG. 10. Additionally, or alternatively, two or more of the steps of the process flow 1000 may be performed in parallel.

FIG. 11 illustrates another process flow 1100 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 1100.

As shown in FIG. 11, the process flow 1100 may include a neuro meta intelligent framework (NMIF) 1102, an autonomous metaverse decision framework 1104, and a haptic device 1118 (e.g., a virtual reality system, a virtual reality headset, and/or the like). In some embodiments, the NMIF 1102 and the autonomous metaverse decision framework 1104 may be similar to other frameworks described herein. As shown in FIG. 11, the autonomous metaverse decision framework 1104 may include a region feature extraction module 1106, a decision making module 1107, a derived decision module 1110, a permissible action module 1112, a metaverse region based permission module 1114, and a motive identification module 1116.

As shown in FIG. 11, the process flow 1100 may include providing, using the NMIF 1102, features and coordinates of an avatar and/or an object entering a virtual world to the autonomous metaverse decision framework 1104. For example, an avatar may be associated with a user that is wearing and/or using a virtual reality system, a virtual reality headset, and/or any other type of computing device capable of accessing the virtual world. In some embodiments, the avatar may acquire an object that previously was not in the virtual world, and the process flow 1100 may be initiated when the avatar enters the virtual world with the object.

As shown in FIG. 11, the process flow 1100 may include step 1151 of extracting, using the region feature extraction module 1106, features and coordinates of each identified frame of the avatar and/or the object. In some embodiments, and as shown in FIG. 11, the region feature extraction module 1106 may include a network of CNNs.

As shown in FIG. 11, the process flow 1100 may include step 1152 of determining, using the decision making module 1108, possible and permissible actions of the avatar and/or the object. In some embodiments, and as shown in FIG. 11, the decision making module 1108 may include a plurality of LSTMs.

As shown in FIG. 11, the process flow 1100 may include step 1153 of determining, using the derived decision module 1110, a plurality of derived decisions. In some embodiments, and as shown in FIG. 11, the process flow 1100 may include determining, using the motive identification module 1116 and based on the plurality of derived decisions, a motive of a user associated with the avatar and/or the object.

As shown in FIG. 11, the process flow 1100 may include step 1154 of generating, using the permissible action module 1112, coordinates for a new motive path for the avatar and/or the object. In some embodiments, and as shown in FIG. 11, the permissible action module 1112 may include a network of RNNs.

As shown in FIG. 11, the process flow 1100 may include step 1155 of restricting, using the metaverse region based permission module 1114, frames and movements based on the generated coordinates for the new motive path. In some embodiments, and as shown in FIG. 11, the metaverse region based permission module 1114 may include a network of RPNs.

As shown in FIG. 11, the process flow 1100 may include providing the permissible frames and movements to the haptic device 1118. For example, the process flow 1100 may include generating content including the permissible frames and movements, providing the content to the haptic device 1118, and displaying the content with the haptic device 1118 to the user associated with the avatar and/or the object.

As will be appreciated by one of ordinary skill in the art in view of the present disclosure, the process flow 1100 may include additional steps, alternative steps, and/or the like. The process flow 1100 may include additional embodiments, such as any single embodiment or any combination of embodiments described herein. Although FIG. 11 shows example steps of the process flow 1100, in some embodiments, the process flow 1100 may include additional steps, fewer steps, different steps, or differently arranged steps than those depicted in FIG. 11. Additionally, or alternatively, two or more of the steps of the process flow 1100 may be performed in parallel.

FIG. 12 illustrates a process flow 1200 for maintaining security of virtual objects in a distributed network (e.g., a virtual world), in accordance with an embodiment of the disclosure. In some embodiments, one or more systems for hosting a virtual world (e.g., similar to the system 130 described herein with respect to FIGS. 1A-1C), one or more virtual reality systems (e.g., similar to the system 130 described herein with respect to FIGS. 1A-1C, similar to the end-point device(s) 140 described herein with respect to FIGS. 1A-1C, and/or the like), one or more virtual reality headsets (e.g., similar to the end-point device(s) 140 described herein with respect to FIGS. 1A-1C), and/or the like may perform the process flow 1200.

As shown in block 1202, the process flow 1200 may include determining, in response to an avatar entering a virtual world and using a first artificial intelligence engine, motives of a user associated with the avatar, where the first artificial intelligence engine is configured to determine motives of users associated with avatars in the virtual world. For example, a system for hosting the virtual world, a virtual reality system, a virtual reality headset, and/or the like may determine, in response to an avatar entering a virtual world and using the first artificial intelligence engine, motives of a user associated with the avatar. In some embodiments, the first artificial intelligence engine may be similar to and/or include one or more of the frameworks, machine learning models, and/or the like described herein. Additionally, or alternatively, the process flow 1200 may include, when determining the motives of the user, determining the motives of the user based on metadata associated with the avatar in a database (e.g., one or more of the databases, data structures, and/or the like described herein).

As shown in block 1204, the process flow 1200 may include determining, based on the motives of the user and using a second artificial intelligence engine, access paths of the avatar in the virtual world, where the second artificial intelligence engine is configured to determine access paths of the avatars in the virtual world. For example, a system for hosting the virtual world, a virtual reality system, a virtual reality headset, and/or the like may determine, based on the motives of the user and using the second artificial intelligence engine, access paths of the avatar in the virtual world. In some embodiments, the second artificial intelligence engine may be similar to and/or include one or more of the frameworks, machine learning models, and/or the like described herein.

As shown in block 1206, the process flow 1200 may include determining, based on the access paths of the avatar in the virtual world and using a third artificial intelligence engine, viewing angles of the avatar moving along the access paths in the virtual world, where the third artificial intelligence engine is configured to determine viewing angles of the avatars moving along the access paths in the virtual world. For example, a system for hosting the virtual world, a virtual reality system, a virtual reality headset, and/or the like may determine, based on the access paths of the avatar in the virtual world and using the third artificial intelligence engine, viewing angles of the avatar moving along the access paths in the virtual world. In some embodiments, the third artificial intelligence engine may be similar to and/or include one or more of the frameworks, machine learning models, and/or the like described herein.

As shown in block 1208, the process flow 1200 may include generating, based on attributes of the user, the motives of the user, the access paths of the avatar, and the viewing angles of the avatar moving along the access paths in the virtual world and using a fourth artificial intelligence engine, user-specific visual content to be rendered in the virtual world for viewing by the user, where the fourth artificial intelligence engine is configured to generate visual content based on attributes of the users, the motives of the users, the access paths of the avatars, and the viewing angles of the avatars moving along the access paths in the virtual world. For example, a system for hosting the virtual world, a virtual reality system, a virtual reality headset, and/or the like may generate, based on attributes of the user, the motives of the user, the access paths of the avatar, and the viewing angles of the avatar moving along the access paths in the virtual world and using the fourth artificial intelligence engine, user-specific visual content to be rendered in the virtual world for viewing by the user. In some embodiments, the fourth artificial intelligence engine may be similar to and/or include one or more of the frameworks, machine learning models, and/or the like described herein.

In some embodiments, the attributes of the user may include privileges of the user. Additionally, or alternatively, the process flow 1200 may include, when generating the user-specific visual content, generating, using the fourth artificial intelligence engine, the user-specific visual content to (i) omit information that the user is not privileged to view and (ii) include normalizing visual content that, when rendered by the user device, makes the virtual world appear normal to the user despite the omitted information. In some embodiments, the omitted information may include an object in the virtual world, confidential information, another avatar in the virtual world, another access path, and/or the like. Additionally, or alternatively, the omitted information may be viewable by other users associated with other avatars in the virtual world.

As shown in block 1210, the process flow 1200 may include causing a user device associated with the user to render the user-specific visual content in the virtual world. For example, a system for hosting the virtual world, a virtual reality system, a virtual reality headset, and/or the like may cause a user device associated with the user to render the user-specific visual content in the virtual world. As another example, a system for hosting the virtual world, a virtual reality system, a virtual reality headset, and/or the like may render and display the user-specific visual content in the virtual world (e.g., for viewing by the user).

In some embodiments, the user device may include a display, and the process flow 1200 may include, when causing the user device associated with the user to render the user-specific visual content in the virtual world, rendering the user-specific visual content in the virtual world on the display. Additionally, or alternatively, the user device may include a control interface, and the process flow 1200 may include, when causing the user device associated with the user to render the user-specific visual content in the virtual world, providing haptic feedback to the user via the control interface as the user interacts with the virtual world.

In some embodiments, the process flow 1200 may include monitoring actions of the avatar within the virtual world and updating, using the first artificial intelligence engine, the motives of the user. Additionally, or alternatively, the process flow 1200 may include updating, based on the updated motives of the user and using the second artificial intelligence engine, the access paths of the avatar in the virtual world. In some embodiments, the process flow 1200 may include updating, based on the updated access paths of the avatar in the virtual world and using the third artificial intelligence engine, the viewing angles of the avatar moving along the updated access paths in the virtual world. Additionally, or alternatively, the process flow 1200 may include updating, based on the attributes of the user, the updated motives of the user, the updated access paths of the avatar, and the updated viewing angles of the avatar moving along the access paths in the virtual world and using the fourth artificial intelligence engine, the visual content to be rendered in the virtual world for viewing by the user. In some embodiments, the process flow 1200 may include causing the user device associated with the user to render the updated visual content in the virtual world. Additionally, or alternatively, the process flow 1200 may include rendering and displaying the user-specific visual content in the virtual world (e.g., for viewing by the user).

As will be appreciated by one of ordinary skill in the art in view of the present disclosure, the process flow 1200 may include additional steps, alternative steps, and/or the like. The process flow 1200 may include additional embodiments, such as any single embodiment or any combination of embodiments described herein. Although FIG. 12 shows example blocks of the process flow 1200, in some embodiments, the process flow 1200 may include additional blocks, fewer blocks, different blocks, or differently arranged blocks than those depicted in FIG. 12. Additionally, or alternatively, two or more of the blocks of the process flow 1200 may be performed in parallel.

FIG. 13 illustrates an exemplary architecture of a machine learning (ML) subsystem 1300, in accordance with an embodiment of the invention. The machine learning subsystem 1300 may include a data acquisition engine 1302, a data ingestion engine 1310, a data pre-processing engine 1316, a ML model tuning engine 1322, and an inference engine 1336. In some embodiments, one or more systems for hosting a virtual world, one or more virtual reality systems, one or more virtual reality headsets, one or more haptic devices, and/or the like described herein with respect to FIGS. 1A-1C and 2-12 may include and/or use the machine learning subsystem 1300 to perform one or more of the steps of one or more of the process flows described herein. For example, the first artificial intelligence engine, the second artificial intelligence engine, the third artificial intelligence engine, and/or the fourth artificial intelligence engine described herein with respect to FIG. 12 may include and/or use the machine learning subsystem 1300 to perform one or more of the steps of process flow 1200.

The data acquisition engine 1302 may identify various internal and/or external data sources to generate, test, and/or integrate new features for training a machine learning model 1324. These internal and/or external data sources 1304, 1306, and 1308 may be initial locations where the data originates or where physical information is first digitized. The data acquisition engine 1302 may identify the location of the data and describe connection characteristics for access and retrieval of data. In some embodiments, data is transported from each data source 1304, 1306, or 1308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the data sources 1304, 1306, and 1308 may include data regarding one or more virtual worlds, data regarding one or more avatars, data regarding one or more objects, and/or Enterprise Resource Planning (ERP) databases that host data related to day-to-day business activities such as accounting, procurement, project management, exposure management, supply chain operations, and/or the like, a mainframe that is often an entity's central data processing center, edge devices that may be any piece of hardware, such as sensors, actuators, gadgets, appliances, and/or machines, that are programmed for certain applications and can transmit data over the internet or other networks, and/or the like. The data acquired by the data acquisition engine 1302 from these data sources 1304, 1306, and 1308 may then be transported to the data ingestion engine 1310 for further processing. In some embodiments, the data sources 1304, 1306, and 1308 may include historical data associated with virtual worlds, avatars, objects, and/or the like, historical data associated with actions taken by avatars, objects, and/or the like within virtual worlds, historical data associated with attributes, privileges, entitlements, and/or the like of avatars and/or objects, historical data associated with motives of users associated with avatars, historical data associated with access paths of avatars, historical data associated with viewing angles of avatars moving along access paths, historical data associated with visual content in virtual worlds, and/or the like.

Depending on the nature of the data imported from the data acquisition engine 1302, the data ingestion engine 1310 may move the data to a destination for storage or further analysis. Typically, the data imported from the data acquisition engine 1302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data acquisition engine 1302, the data may be ingested in real-time, using a stream processing engine 1312, in batches using the batch data warehouse 1314, or a combination of both. The stream processing engine 1312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 1314 collects and transfers data in batches according to scheduled intervals, trigger events, or any other logical ordering.

In machine learning, the quality of data and the useful information that can be derived therefrom directly affects the ability of the machine learning model 1324 to learn. The data pre-processing engine 1316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 1316 may implement feature extraction and/or selection techniques to generate training data 1318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 1318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 1322 may be used to train a machine learning model 1324 using the training data 1318 to make predictions or decisions without explicitly being programmed to do so. The machine learning model 1324 represents what was learned by the selected machine learning algorithm 1320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 1322 may repeatedly execute cycles of initialization 1326, testing 1328, and calibration 1330 to optimize the performance of the machine learning algorithm 1320 and refine the results in preparation for deployment of those results for consumption or decision making. To this end, the ML model tuning engine 1322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 1318. A fully trained machine learning model 1332 is one whose hyperparameters are tuned and model accuracy maximized.

The trained machine learning model 1332, similar to any other software application output, can be persisted to storage, file, memory, or application, or looped back into the processing component to be reprocessed. More often, the trained machine learning model 1332 is deployed into an existing production environment to make practical business decisions based on live data 1334. To this end, the machine learning subsystem 1300 uses the inference engine 1336 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 1338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 1338) live data 1334 based on how similar they are to one another to solve exploratory challenges where little is known about the data, provide a description or label (e.g., $C\_1, C\_2 \ldots C\_n$ 1338) to live data 1334, such as in classification, and/or the like. These categorized outputs, groups (clusters), or labels are then presented to a user input system 1340, which may be similar to the end-point device(s) 140 shown and described herein with respect to FIGS. 1A-1C. In still other cases, machine learning models that perform regression techniques may use live data 1334 to predict or forecast continuous outcomes.

As noted, in some embodiments, one or more systems for hosting a virtual world, one or more virtual reality systems, one or more virtual reality headsets, one or more haptic devices, and/or the like described herein with respect to FIGS. 1A-1C and 2-12 may include and/or use the machine learning subsystem 1300 to perform one or more of the steps of the process flows described herein. For example, the first artificial intelligence engine, the second artificial intelligence engine, the third artificial intelligence engine, and/or the fourth artificial intelligence engine described herein with respect to FIG. 12 may include and/or use one or more machine learning models similar to trained machine learning model 1332 and/or one or more inference engines similar to the inference engine 1336. In some embodiments, the first artificial intelligence engine may use the one or more machine learning models to determine motives of users associated with avatars in a virtual world. Additionally, or alternatively, the second artificial intelligence engine may use the one or more machine learning models to determine access paths of the avatars in the virtual world. In some embodiments, the third artificial intelligence engine may use the one or more machine learning models to determine viewing angles of the avatars moving along the access paths in the virtual world. Additionally, or alternatively, the fourth artificial intelligence engine may use the one or more machine learning models to generate visual content based on attributes of the users, the motives of the users, the access paths of the avatars, and the viewing angles of the avatars moving along the access paths in the virtual world.

It will be understood that the embodiment of the machine learning subsystem 1300 illustrated in FIG. 13 is exemplary and that other embodiments may vary. As another example, in some embodiments, the machine learning subsystem 1300 may include more, fewer, or different components.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (e.g., a non-transitory computer readable medium including firmware, resident software, micro-code, computer program code, and/or the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for maintaining security of virtual objects in a distributed network, the system comprising:
  a first artificial intelligence engine configured to determine viewing angles of avatars moving along access paths in a virtual world;
  a second artificial intelligence engine configured to determine movements of the avatars moving along the access paths in the virtual world;
  a third artificial intelligence engine configured to generate visual content based on attributes of users associated with the avatars, the access paths, the viewing angles of the avatars moving along the access paths in the virtual world, and the movements of the avatars moving along the access paths in the virtual world;
  a processing device; and
  a non-transitory storage device comprising computer program code stored thereon, wherein the computer program code comprises computer instructions configured to cause the processing device to:
    determine access paths of an avatar in the virtual world, wherein the avatar is associated with a user;
    determine, based on the access paths of the avatar in the virtual world and using the first artificial intelligence engine, viewing angles of the avatar moving along the access paths in the virtual world, wherein the first artificial intelligence engine comprises a neuro meta intelligent framework (NMIF);
    determine, based on the access paths of the avatar in the virtual world and using the second artificial intelligence engine, movements of the avatar moving along the access paths in the virtual world;
    generate, based on attributes of the user, the access paths of the avatar, the viewing angles of the avatar moving along the access paths in the virtual world, the movements of the avatar moving along the access paths, and using the third artificial intelligence engine, user-specific visual content to be rendered in the virtual world for viewing by the user; and
    cause a user device associated with the user to render the user-specific visual content in the virtual world.

2. The system of claim 1, wherein the attributes of the user comprise privileges of the user.

3. The system of claim 2, wherein the computer program code comprises computer instructions configured to cause the processing device to, when generating the user-specific visual content, generate, using the third artificial intelligence engine, the user-specific visual content to (i) omit information that the user is not privileged to view and (ii) comprise normalizing visual content that, when rendered by the user device, makes the virtual world appear normal to the user despite the omitted information.

4. The system of claim 3, wherein the omitted information comprises at least one of an object in the virtual world, confidential information, another avatar in the virtual world, or another access path, and wherein the omitted information is viewable by other users associated with other avatars in the virtual world.

5. The system of claim 1, wherein the computer program code comprises computer instructions configured to cause the processing device to:
  monitor actions of the avatar within the virtual world; and
  update, based on the actions of the avatar and using the first artificial intelligence engine, the viewing angles of the avatar.

6. The system of claim 5, wherein the computer program code comprises computer instructions configured to cause the processing device to update, based on the actions of the avatar and using the second artificial intelligence engine, the movements of the avatar.

7. The system of claim 6, wherein the computer program code comprises computer instructions configured to cause the processing device to update, based on the updated viewing angles and using the third artificial intelligence engine, the visual content to be rendered in the virtual world for viewing by the user.

8. The system of claim 7, wherein the computer program code comprises computer instructions configured to cause the processing device to cause the user device associated with the user to render the updated visual content in the virtual world.

9. The system of claim 1, wherein the system comprises the user device, wherein the user device comprises a display, and wherein the computer program code comprises computer instructions configured to cause the processing device to, when causing the user device associated with the user to render the user-specific visual content in the virtual world, render the user-specific visual content in the virtual world on the display.

10. The system of claim 9, wherein the user device comprises a control interface, and wherein the computer program code comprises computer instructions configured to cause the processing device to, when causing the user device associated with the user to render the user-specific visual content in the virtual world, provide haptic feedback to the user via the control interface as the user interacts with the virtual world.

11. The system of claim 1, wherein the NMIF comprises a first spatial convolutional neural network (CNN) and a first long short-term memory (LSTM) framework, and wherein the computer program code comprises computer instructions configured to cause the processing device to, when determining the viewing angles of the avatar moving along the access paths in the virtual world:
  receive viewing angle-based frames;
  process, via the first spatial CNN and via the first LSTM framework, the viewing angle-based frames; and
  predict, via the first spatial CNN, via the first LSTM framework, and based on the viewing angle-based frames, future views of the avatar to determine the viewing angles of the avatar moving along the access paths in the virtual world.

12. A computer program product for maintaining security of virtual objects in a distributed network, the computer program product comprising a non-transitory computer-readable medium comprising code causing an apparatus to:

determine access paths of an avatar in a virtual world, wherein the avatar is associated with a user;

determine, based on the access paths of the avatar in the virtual world and using a first artificial intelligence engine, viewing angles of the avatar moving along the access paths in the virtual world, wherein the first artificial intelligence engine is configured to determine viewing angles of avatars moving along access paths in a virtual world, wherein the first artificial intelligence engine comprises a neuro meta intelligent framework (NMIF);

determine, based on the access paths of the avatar in the virtual world and using a second artificial intelligence engine, movements of the avatar moving along the access paths in the virtual world, wherein the second artificial intelligence engine is configured to determine movements of the avatars moving along the access paths in the virtual world;

generate, based on attributes of the user, the access paths of the avatar, the viewing angles of the avatar moving along the access paths in the virtual world, the movements of the avatar moving along the access paths, and using a third artificial intelligence engine, user-specific visual content to be rendered in the virtual world for viewing by the user, wherein the third artificial intelligence engine is configured to generate visual content based on attributes of users associated with the avatars, the access paths, the viewing angles of the avatars moving along the access paths in the virtual world, and the movements of the avatars moving along the access paths in the virtual world; and cause a user device associated with the user to render the user-specific visual content in the virtual world.

13. The computer program product of claim 12, wherein the attributes of the user comprise privileges of the user.

14. The computer program product of claim 13, wherein the non-transitory computer-readable medium comprises code causing the apparatus to, when generating the user-specific visual content, generate, using the third artificial intelligence engine, the user-specific visual content to (i) omit information that the user is not privileged to view and (ii) comprise normalizing visual content that, when rendered by the user device, makes the virtual world appear normal to the user despite the omitted information.

15. The computer program product of claim 14, wherein the omitted information comprises at least one of an object in the virtual world, confidential information, another avatar in the virtual world, or another access path.

16. The computer program product of claim 14, wherein the omitted information is viewable by other users associated with other avatars in the virtual world.

17. The computer program product of claim 12, wherein the non-transitory computer-readable medium comprises code causing the apparatus to:

monitor actions of the avatar within the virtual world; and update, based on the actions of the avatar and using the first artificial intelligence engine, the viewing angles of the avatar.

18. The computer program product of claim 17, wherein the non-transitory computer-readable medium comprises code causing the apparatus to update, based on the actions of the avatar and using the second artificial intelligence engine, the movements of the avatar.

19. The computer program product of claim 18, wherein the non-transitory computer-readable medium comprises code causing the apparatus to update, based on the updated viewing angles and using the third artificial intelligence engine, the visual content to be rendered in the virtual world for viewing by the user.

20. A method for maintaining security of virtual objects in a distributed network, the method comprising:

determining access paths of an avatar in a virtual world, wherein the avatar is associated with a user;

determining, based on the access paths of the avatar in the virtual world and using a first artificial intelligence engine, viewing angles of the avatar moving along the access paths in the virtual world, wherein the first artificial intelligence engine is configured to determine viewing angles of avatars moving along access paths in a virtual world, wherein the first artificial intelligence engine comprises a neuro meta intelligent framework (NMIF);

determining, based on the access paths of the avatar in the virtual world and using a second artificial intelligence engine, movements of the avatar moving along the access paths in the virtual world, wherein the second artificial intelligence engine is configured to determine movements of the avatars moving along the access paths in the virtual world;

generating, based on attributes of the user, the access paths of the avatar, the viewing angles of the avatar moving along the access paths in the virtual world, the movements of the avatar moving along the access paths, and using a third artificial intelligence engine, user-specific visual content to be rendered in the virtual world for viewing by the user, wherein the third artificial intelligence engine is configured to generate visual content based on attributes of users associated with the avatars, the access paths, the viewing angles of the avatars moving along the access paths in the virtual world, and the movements of the avatars moving along the access paths in the virtual world; and causing a user device associated with the user to render the user-specific visual content in the virtual world.

\* \* \* \* \*